(12) United States Patent
Zama et al.

(10) Patent No.: US 7,943,240 B2
(45) Date of Patent: May 17, 2011

(54) CONDUCTIVE POLYMER COMPOSITE STRUCTURE

(75) Inventors: Tetsuji Zama, Suita (JP); Susumu Hara, Suita (JP); Shingo Sewa, Suita (JP)

(73) Assignee: Eamax Corporation, Suita-shi (JP)

( * ) Notice: Subject to any disclaimer, the term of this patent is extended or adjusted under 35 U.S.C. 154(b) by 0 days.

(21) Appl. No.: 12/131,916

(22) Filed: Jun. 2, 2008

(65) Prior Publication Data

US 2009/0004476 A1  Jan. 1, 2009

Related U.S. Application Data

(62) Division of application No. 10/533,915, filed as application No. PCT/JP03/14094 on Nov. 5, 2003, now abandoned.

(30) Foreign Application Priority Data

Nov. 5, 2002 (JP) ................................ 2002-321671
Dec. 24, 2002 (JP) ................................ 2002-373085
Dec. 27, 2002 (JP) ................................ 2002-380860

(51) Int. Cl.
*B32B 9/04* (2006.01)
(52) U.S. Cl. ................ 428/411.1; 428/692.1; 428/693.1
(58) Field of Classification Search .................. None
See application file for complete search history.

(56) References Cited

U.S. PATENT DOCUMENTS

| 4,948,685 | A | * | 8/1990 | Ohsawa et al. | 429/213 |
|---|---|---|---|---|---|
| 5,340,500 | A | * | 8/1994 | Chao et al. | 252/500 |
| 5,407,699 | A | * | 4/1995 | Myers | 427/121 |
| 6,277,304 | B1 | * | 8/2001 | Wei et al. | 252/500 |
| 6,573,639 | B1 | * | 6/2003 | Heinz et al. | 310/363 |
| 6,914,105 | B1 | * | 7/2005 | Charpentier et al. | 526/67 |

FOREIGN PATENT DOCUMENTS

| JP | 9-312984 A | 12/1997 |
|---|---|---|
| JP | 2000083389 A | * 3/2000 |
| JP | 2000-133854 A | 5/2000 |

OTHER PUBLICATIONS

European Office Action dated Dec. 27, 2010, issued in corresponding European Patent Application No. 03810597.9.

* cited by examiner

*Primary Examiner* — Mark Ruthkosky
*Assistant Examiner* — Gary Harris
(74) *Attorney, Agent, or Firm* — Westerman, Hattori, Daniels & Adrian, LLP

(57) ABSTRACT

In order to obtain actuator elements capable of being displaced such as expansion and contract or bending for practical use even when used as actuator elements with larger size, stacked layers or bundles in which conductive polymer-containing layers or fiber-like tubes are provided with conductive polymer composite structures which include conductive substrates and conductive polymers, said conductive substrates have deformation property, and conductivity of said conductive substrates is not less than $1.0 \times 10^3$ S/cm are used.

21 Claims, 11 Drawing Sheets

CONDUCTIVE POLYMER COMPOSITE STRUCTURE

The present application is a divisional application and claims priority under 35 U.S.C. 120 to U.S. patent application Ser. No. 10/533,915, entitled Conductive Polymer Composite Structure, filed on Dec. 12, 2005 to Tetsuji Zama, Osaka, (JP), as a national stage entry from PCT/JP03/14094, filed on Nov. 5, 2003 and claiming priority under 35 U.S.C. 119 to JAPAN 2002-380860 Dec. 27, 2002, JAPAN 2002-373085 Dec. 24, 2002 and JAPAN 2002-321671 Nov. 5, 2002. The entire disclosures of each of the foregoing listed U.S., PCT, and JAPAN applications are incorporated herein by reference as though recited herein in full.

FIELD OF THE INVENTION

The present invention relates to conductive polymer composite structures in which conductive polymers and conductive substrate are composite, process for producing the same, process for producing conductive polymers, bundles and stacked layers of conductive polymer composite structures.

BACKGROUND ART

Conductive polymers such as polypyrrole and the like are known to have electrochemomechanical deformation, phenomena of expansion and contraction by electrochemical redox reaction. Recently, this electrochemomechanical deformation of conductive polymers has been attracting public attention, because this is expected to be applied for the use of artificial muscles, robot arms, artificial arms, actuators and the like and applications not only for smaller equipments such as for micro machines and the like, but also for larger machines have been attracting public attention as well.

As a process for producing conductive polymers, a process by electrochemical polymerization method is common. A common electrochemical polymerization method includes by adding monomer components such as pyrrole and the like in electrolytic solution, providing a working electrode and a counter electrode in this electrolyte, and applying voltage between the electrodes, thereby forming conductive polymers as films on the working electrode (e.g. see pages 70 to 73, "Conductive polymers" $8^{th}$ edition by Naoya Ogata, published by Scientific K.K, Feb. 10, 1990"). Conductive polymers obtained by electrochemical polymerization can be subject to displacement such as expansion-contraction or bending by applying voltage to conductive polymers formed like films.

When elements which include conductive polymers manufactured by electrochemical polymerization (hereinafter called conductive polymer elements) are used as actuators in a driving part for uses of large sized equipments such as robot arms of industrial robots and the like, and artificial muscles such as artificial hands and the like, compared with elements for the uses of small sized actuators such as for micro machines and the like, it is necessary to make sizes of elements large enough to obtain larger amount of expansion-contraction or larger electrochemical stress. Therefore, in order to enlarge sizes of conductive polymer elements, it is necessary that conductive polymer films obtained by electrochemical polymerization are processed to be longer or thicker by piling up plural of films, or the like.

As conductive polymer elements with larger sizes, with a view to obtaining larger expansion and contraction in the length direction and in the height direction compared with conventional uses, longer conductive polymer elements compared with conventional conductive polymer elements are also used since they are sometimes used as driving parts, the use which requires enlarged conductive polymer elements in the length direction or in the height direction. Desirable electrochemical strain can be obtained by selecting the kinds of conductive polymers and dopants depending on the uses and by controlling the length of conductive polymer elements since deformation ratio of conductive polymer elements is determined by the kinds of conductive polymers and dopants which are included in conductive polymer elements.

However, in obtaining large electrochemical strain, there is a problem that, regarding the conductive polymer elements with selected kinds of conductive polymers and dopants, for example, satisfactory potential cannot be applied at the upper portion of elements since the conductivity of conductive polymers obtained by electrochemical polymerization is generally around $10^2$ S/cm even when electrodes are provided on the whole bottom surface in the case where the conductive polymer elements enlarged in the direction of the columnar body height are used, and in the dedoped state, since conductivity further lowers, satisfactory potential cannot be applied at the upper portion of electrodes and when electrodes such as metal plates and the like are provided in the height direction, electrodes such as metal plates and the like inhibit the motion of conductive polymer elements, causing the problem of difficulty for said conductive polymer elements to expand and contract.

In order to solve the above problem, as a means to obtain large electrochemical strain of conductive polymer elements, one idea of pasting highly conductive metal films on surfaces of conductive polymer elements may be considered. However, since conductive polymer elements provided with said metal films on surfaces inhibit deformation since highly conductive metal films have little deformation property and these films cannot be applied to actuators which move in a linear manner by voltage application because displacement by electrochemical redox becomes bending but not expansion and contract. In addition, when conductive polymer elements provided with said metal films are applied to actuators which moves in a linear manner, a problem that metal films are separated from metal films due to repeated displacement and when metal films are firmly fixed to conductive polymer elements to conductive polymer elements with adhesives and the like, the problem that even bending motion is inhibited occurs. In addition, elements capable of uniformly applying electric charge over a whole element by connecting a lead to one point of a bottom surface of said elements are more advantageous since a composition of a element-driving device is not restricted.

Further, since large sized conductive polymer elements do not have high mechanical strength in conductive polymer elements, mechanical strength required for applications to robot arms such as industrial robots and the like, artificial muscles such as artificial hands which are the applications to large sizes may be not enough. Therefore, it is desirable to employ reinforcement means which improves mechanical strength of conductive polymer elements when large sized conductive polymer elements are used as practical uses.

Further, since conductive polymers are liable to be cut during the operation process because mechanical strength of conductive polymers themselves is not high, it is difficult to form desirable conductive polymer electrodes, that is, with an external diameter or width of less than 1 mm by processing such as cutting conductive polymer films obtained by electrochemical polymerization and the like in order to obtain small-sized conductive polymer elements represented by micro machines such as nano machines, catheters and the like. In addition, since conductive polymer elements are hard to be melted, production methods such as extrusion moldings, injection moldings and the like cannot be employed, the methods usually employed in producing thin lines such as wires or cylindrical resin mold products. For this reason, actuator elements which are driven to make expanding and contracting motion or to make bending motion by electrochemomechanical deformation of conductive polymers are not put into practical uses as small sized driving parts which include nano machines and micro machines. Therefore, in order to use for small sized elements represented by nano machines and micro machines, it is also desirable to obtain actuator elements which are driven to make expanding and contracting motion or to make bending motion by electrochemomechanical deformation of conductive polymers as small sized elements with external diameter or width of less than 1 mm.

In addition, since it is desirable that large sized actuator elements can produce uniform electrochemical stress in each portion of said actuator elements, it is desirable to uniformize amount of conductive polymers regarding each portion of actuator elements as a whole. Therefore, it is desirable to make further large actuator elements by using plural of actuator elements capable of being displaced for practical use such as expansion and contract or bending. It is necessary that each of plural actuator elements which compose one large sized actuator is obtained but it is desirable that a number of them are produced efficiently and easily in a short time.

It is the object of the present invention to provide elements capable of being displaced for practical use such as expansion and contract or bending even when conductive polymer elements are used as large sized actuator elements.

SUMMARY OF THE INVENTION

The present invention relates to conductive polymer composite structures comprising conductive substrates and conductive polymers, wherein said conductive substrates have deformation property and conductivity of said conductive substrates is not less than $1.0 \times 10^3$ S/cm. By using said conductive polymer composite structures, deformation property is good even when the conductive polymer composite structures are used as larger sized actuator elements. Since said conductive polymer composite structures are provided with structures capable of applying potential to whole elements even when they are used as conductive polymer elements elongated in size in the length direction and in height direction, satisfactory voltage can be applied for driving end portions when used as actuators.

In addition, since the present invention relates to a process for producing conductive polymer composite structures in which electrode holders which can be immersed in an electrolytic bath are immersed in electrolytic solution and then conductive polymers and conductive substrates are combined by electrochemical polymerization interposing electrolyte between a counter electrode and a working electrode and since the present invention relates to a process for producing conductive polymer composite structures in which said working electrode holders are provided with working electrodes, working electrode terminal portions, and electrode holder portions and in which said working electrodes are attached to said working electrode terminal portions, and said working electrodes include at least coiled conductive substrates. In said production process, since electrochemical polymerization is conducted in a state where counter electrodes are put in the vicinity of working electrodes, a large number of conductive polymer composite structures can easily be obtained for short times at the same time.

In addition, the present invention also relates to a process for producing conductive polymer composite structures in which bundles in which coiled conductive substrates are bundled are used as said working electrodes.

When conductive substrates which are said working electrodes are coiled, resistance gets large since metal wires are thin and long, and the larger the conductive substrates get, the less potential transmission becomes, causing the problem of difficulty in forming conductive polymers on the conductive substrates. By this producing process, such problems can be solved.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS (Conductive Polymer Composite Structures)

Conductive polymer composite structures of the present invention are conductive polymer composite structures comprising conductive substrates and conductive polymers, wherein said conductive substrates have deformation property, and conductivity of said conductive substrates is not less than $1.0 \times 10^3$ S/cm.

Hereinafter, shapes of conductive polymer composite structures of the present invention and forms in which conductive substrates are included in the conductive polymer composite structures of the present invention are explained by using drawings, however, shapes of conductive polymer composite structures and forms in which conductive substrates are included in the conductive polymer composite structures of the present invention are not limited to what are illustrated in these drawings as long as conductive polymer composite structures can obtain satisfactory displacement such as expansion and contraction or bending as practical performances.

Figure 1:
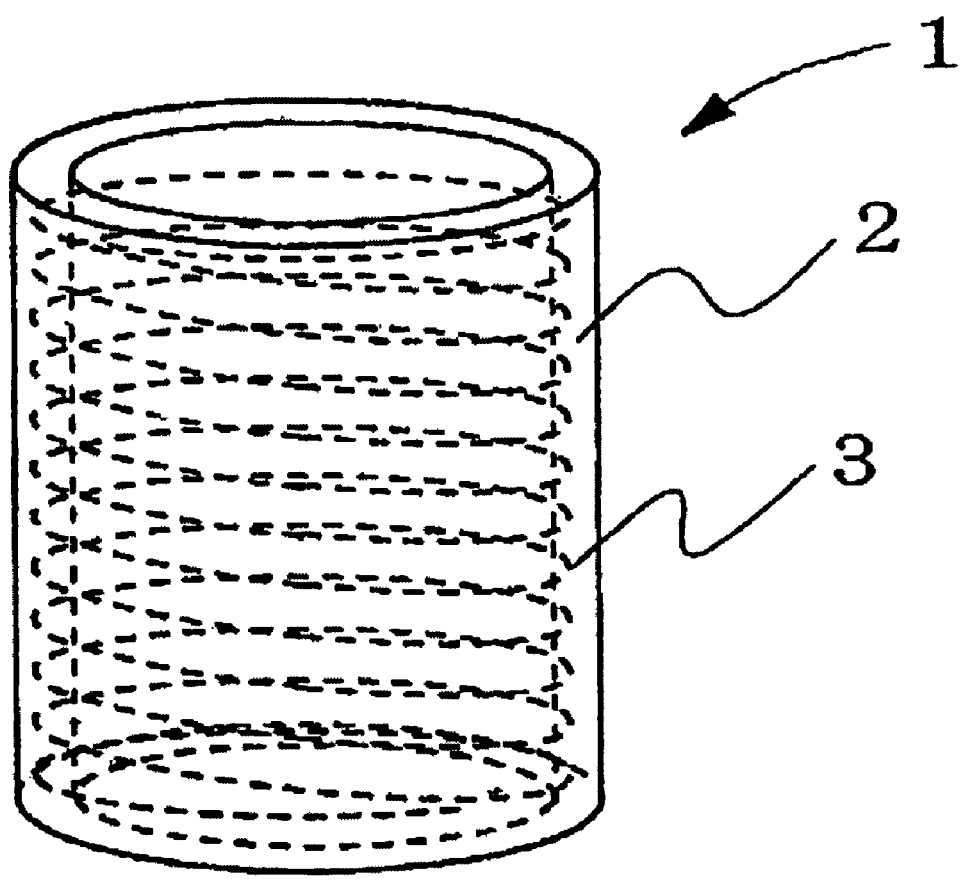
FIG. 1 is a typical perspective view of conductive polymer composite structures of the present invention when spring-type members are used as conductive substrates.
Figure 2:
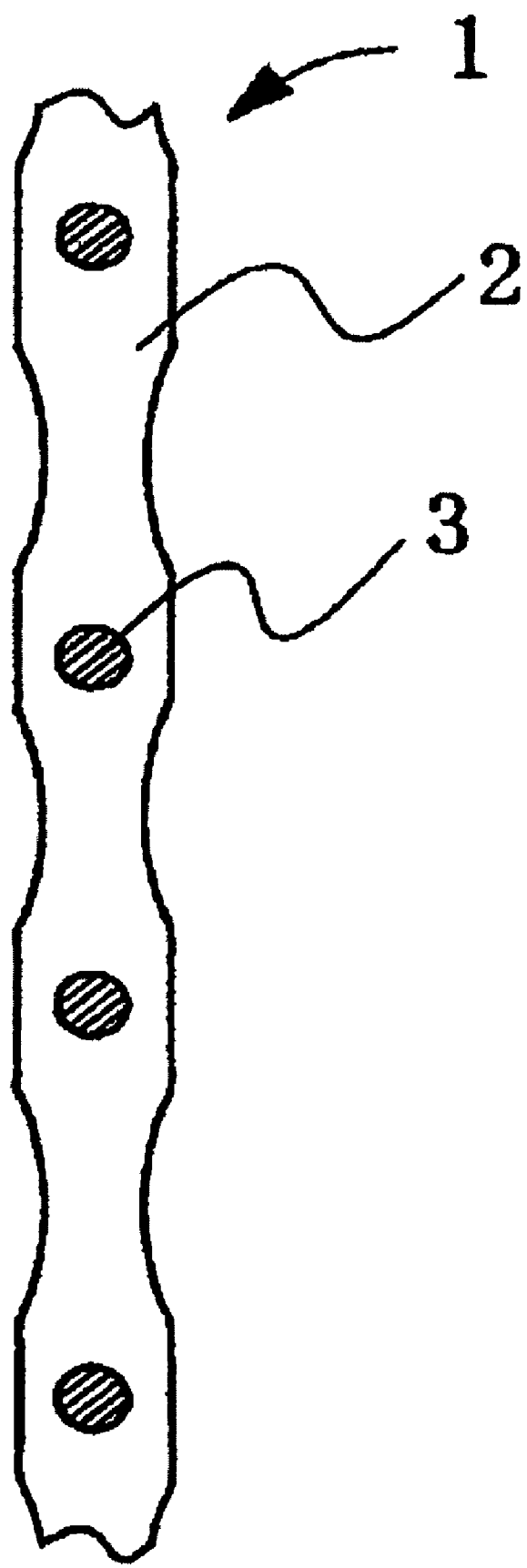
FIG. 2 is a partial enlarged view of a longitudinal section of conductive polymer composite structures in FIG. 1.

FIG. 1 is a typical perspective view of conductive polymer composite structures of the present invention when coiled metal spring-type members are used as conductive substrates. FIG. 2 is a partial enlarged view of a longitudinal section of conductive polymer composite structures in FIG. 1. In conductive polymer composite structure 1 in FIG. 1, coiled metal spring-type member 3 is used as a conductive substrate. As shown in FIG. 2, in cylindrical conductive polymer composite structure 1 in FIG. 1, spaces between wires which compose coiled metal spring-type members are filled by conductive polymer 2, and conductive polymer 2 and conductive substrate 3 are complexed. By this composition, even when the size of actuators are made large, conductive polymer composite structures can produce satisfactory displacement such as expansion and contraction or bending as practical performances. In addition, since conductive polymer composite structures in FIG. 1 include coiled metal spring-type members, wires of metal spring-type members can function as reinforcement materials when external force is applied from the direction vertical to an outer surface, improvement in mechanical strength can also be attained.

Figure 3:
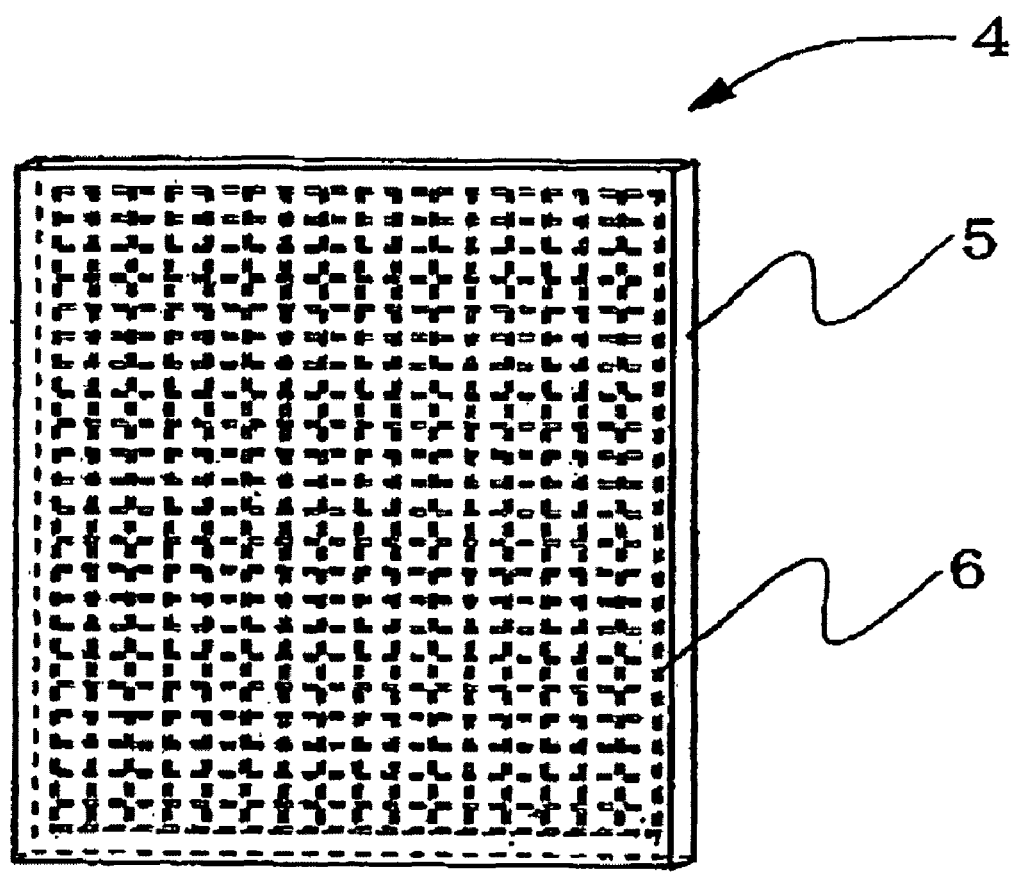
FIG. 3 is a typical perspective view of conductive polymer composite structures of the present invention when metal meshes are used as conductive substrates.

FIG. 3 is a typical perspective view of conductive polymer composite structures of the present invention when metal meshes which are network members are used as conductive substrates. In cylindrical conductive polymer composite structure 4 in FIG. 3, spaces between wires which compose metal mesh are filled and conductive polymer 5 and conductive substrate 6 are complexed. By this composition, even when the size of actuators are made large, conductive polymer composite structures can produce satisfactory displacement such as expansion and contraction or bending as practical performances. In addition, since conductive polymer composite structures in FIG. 3 include metal mesh, wires of metal spring-type members can function as reinforcement materials when external force such as tension and the like is applied, improvement in mechanical strength can also be attained.

Although said conductive polymer substrates have space portions as shown in FIGS. 1 and 3 between conductive wires which compose coiled metal spring-type members and metal mesh, said space portions are not specifically limited. When spaces between wires are large and therefore said space portions are large, by combining auxiliary electrode substrates with said conductive substrates, conductive polymer composite structures in which space portions are filled by conductive polymers can be obtained. For example, when conductive substrates are metal meshes with large openings, metal plates are used as auxiliary electrode substrates, and by applying electrochemical polymerization using said metal meshes laminated on said metal plates as working electrodes, followed by removing said metal plates, conductive polymer composite structures in which metal mesh space portions are filled by conductive polymers can be obtained. In addition, said conductive polymer substrates may be provided with space portions which are other than wires, such as leaf springs and the like.

Said conductive substrates may be included in such a way that satisfactory potential is applied over said whole conductive polymer composite structures, and as shown in FIGS. 1 and 3, said conductive substrates may be arranged in the vicinity of a center of conductive polymer composite structures in the thickness direction or said conductive substrates may be arranged in the vicinity of surfaces of conductive polymer composite structures, however, it is preferable that said conductive substrates may be arranged in the vicinity of a center of conductive polymer composite structures in the thickness direction since satisfactory potential can be easily applied to the whole elements. In addition, it is preferable that said conductive substrates are included in substantially whole said conductive polymer composite structures since satisfactory potential can be easily applied to the whole elements, and it is preferable that said conductive substrates have the same shapes as those of said conductive polymer composite structures since satisfactory potential can be easily applied to the whole elements.

Shapes of said conductive polymer composite structures are not specifically limited and as desired, they may be prepared in columnar shapes, prismatic shapes, plate shapes, sheet shapes, tubular shapes, cylindrical shapes, and the like. For example, said conductive polymer composite structures may be cylindrical shapes as shown in FIG. 1 or said conductive polymer composite structures may be film-like shapes as shown in FIG. 3.

In addition, said conductive polymer composite structures may be processed to make them desired shapes as required when the size of elements is large and when the process can easily be made. For example, columnar conductive polymer composite structures may be obtained by winding film-like conductive polymer composite structures shown in FIG. 3 and by filling conductive polymers in communicating space portions in cylindrical shaped conductive polymer composite structures of FIG. 1.

Figure 4:
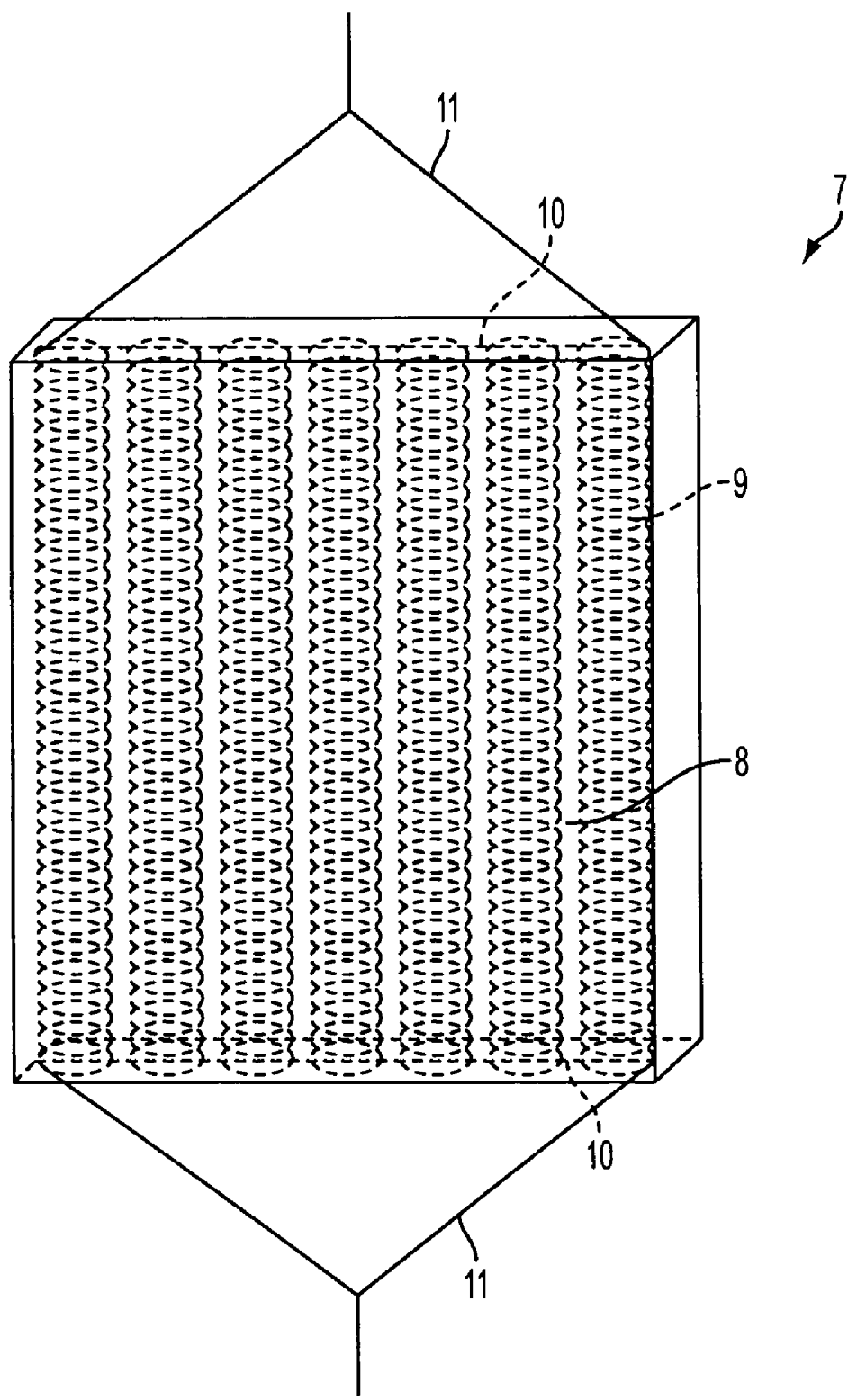
FIG. 4 is a typical perspective view of conductive polymer composite structures of the present invention when tube-like conductive substrates are fixed in parallel to conductive substrates in a stretchable way.

Further, as shown in FIG. 4, coiled metal spring-type members may be prepared in the form of an expander, thereby compounding aligned conductive substrates fixed in parallel in a stretchable way with conductive polymers, or conductive polymer composite structures with metal meshes may be laminated. In addition, depending on uses, desired process may be applied.

Figure 5:
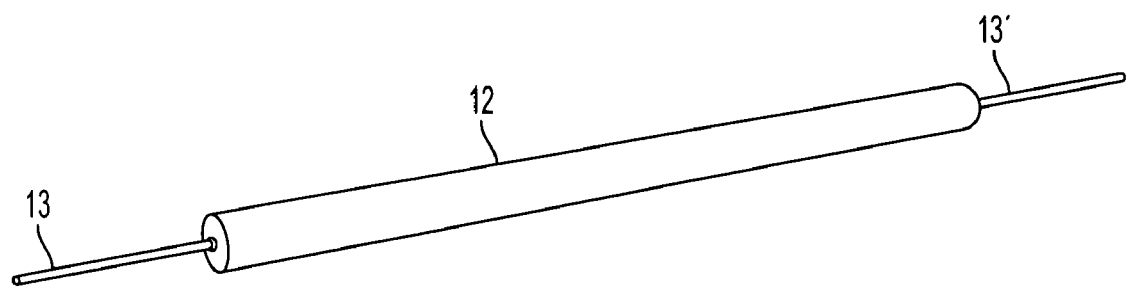
FIG. 5 is a perspective view of cylindrical conductive polymer composite structures using coiled metal spring-type members as conductive substrates.
Figure 6:
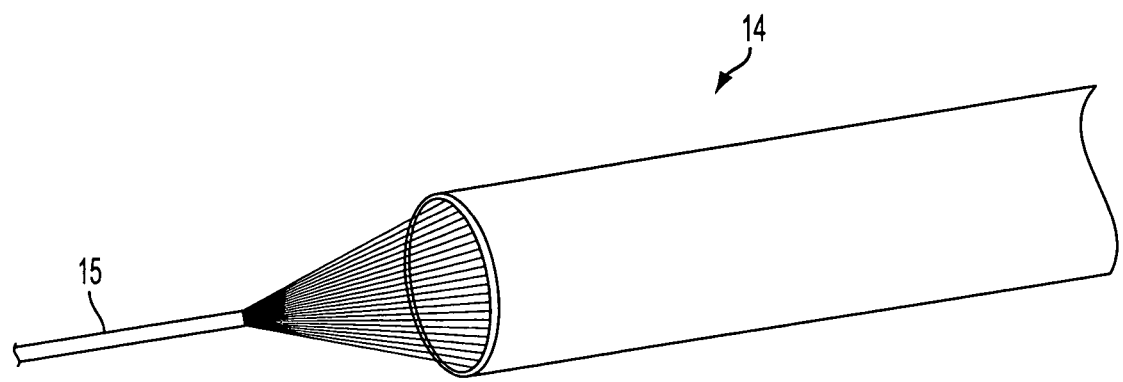
FIG. 6 is a partial enlarged perspective view of one end of groups of bundles of cylindrical conductive polymer composite structures.
Figure 7:
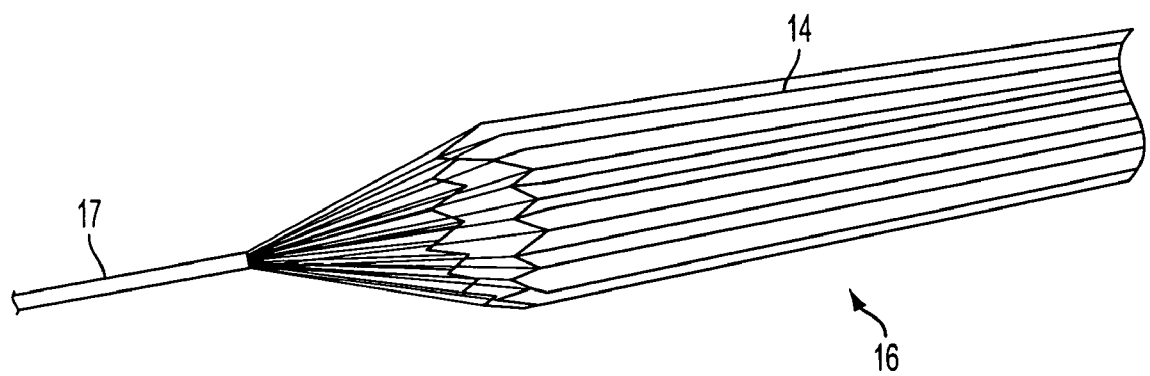
FIG. 7 is a partial enlarged perspective view of one end of groups of bundles of cylindrical conductive polymer composite structures.
Figure 8:
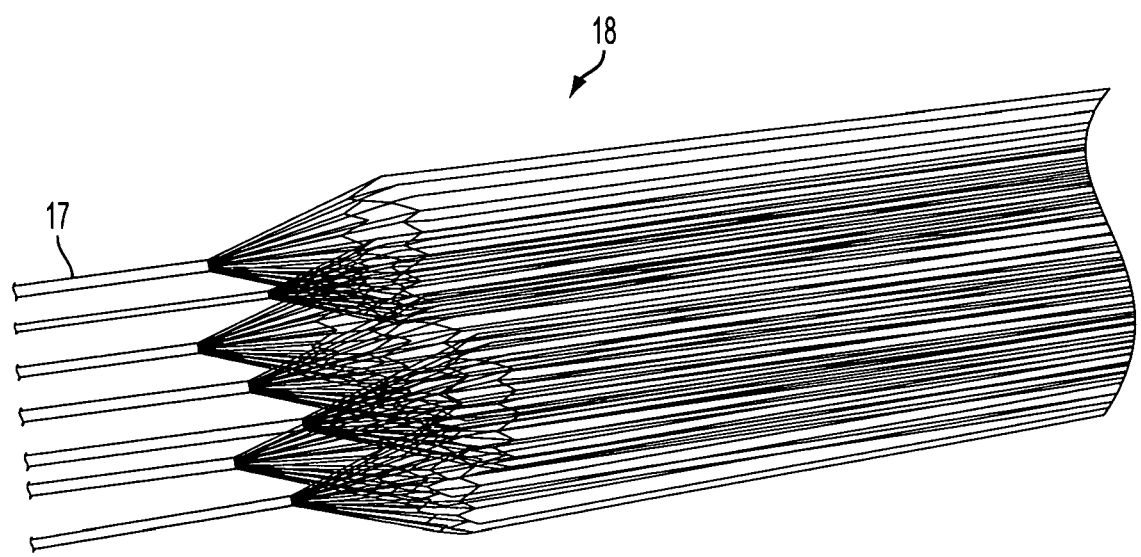
FIG. 8 is a partial enlarged perspective view of one end of groups of bundles of cylindrical conductive polymer composite structures.

Further, in conductive polymer composite structures of the present invention, groups of conductive polymer composite structures can be formed by forming bundles of a plural of conductive polymer composite structures which use coiled metal spring-type members as conductive substrates, further followed by bundling the conductive polymer composite structures. FIG. 5 is a drawing of cylindrical conductive polymer composite structures using coiled metal spring-type members as conductive substrates. FIG. 6 is a partial enlarged perspective view of one end regarding bundles (the first bundles of conductive polymer composite structures) of columnar conductive polymer composite structures obtained by bundling cylindrical conductive polymer composite structures shown in FIG. 5. FIG. 7 is a partial enlarged perspective view of one end regarding groups of bundles (the second bundles of conductive polymer composite structures) of columnar conductive polymer composite structures obtained by bundling the first bundles of conductive polymer composite structures shown in FIG. 6. FIG. 8 is a partial enlarged perspective view of one end regarding bundles of groups (the third bundles of conductive polymer composite structures) of conductive polymer composite structures obtained by bundling the groups of cylindrical conductive polymer composite structures shown in FIG. 7.

In FIG. 5, conductive polymer composite structures 12 are tubular conductive polymer composite structures obtained by jointing metal wires 13 or 13' at both ends of coiled metal spring-type members in the length direction as a conductive substrate, connecting said metal wires 13 and 13' to a power supply and generating conductive polymers on a conductive substrate by a publicly known electrochemical polymerization method. In FIG. 5, although conductive polymer composite structures 12 are provided with metal wires on both ends, the metal wire may be provided on either end thereof.

In FIG. 6, bundles 14 of conductive polymer composite structures are the first bundles of conductive polymer composite structures obtained by bundling conductive polymer composite structures 12. By making bundles of conductive polymer composite structures, when they are driven as actuators, larger electrochemical stress can be obtained compared with conductive polymer composite structures. Methods of bundling conductive polymer composite structures to obtain bundles of conductive polymer composite structures are not specifically limited as long as they are the methods of bundling publicly known linear object. In the embodiment in FIG. 6, metal wires 13 provided at the end of conductive polymer composite structures 12 are bundled to form a bundle of metal wires 15. Methods of fixing a bundle of metal wires in a state where the metals are bundled are not specifically limited and such methods may include forming coated films with adhesives and the like around the outer periphery of a bundle of metal wires or fixing a state where the metals are bundled by wrenching metal wires. In addition, in order to easily form a state where conductive polymer composite structures are bundled, it is preferable that bundles of conductive polymer composite structures are provided with a bundle of metal wires in which conductive polymer composite structures are fixed with metal wires on both ends of conductive polymer composite structures bundled on both ends. Further, when applying voltage to conductive polymer composite structures to make bundles of conductive polymer composite structures actuators, potential may be applied either to metal wires of both ends of conductive polymer composite structures or to one end thereof.

In FIG. 7, groups of conductive polymer composite structures 16 are the second bundles of conductive polymer composite structures obtained by bundling bundles 14 of conductive polymer composite structures. By being groups of bundles of conductive polymer composite structures, when driven as actuators, the groups of bundles of conductive polymer composite structures can obtain larger electrochemical stress compared with bundles of conductive polymer composite structures.

Methods of bundling bundles of conductive polymer composite structures to produce groups of bundles of conductive polymer composite structures are not specifically limited as long as they are the methods of bundling publicly known linear objects. In addition, in FIG. 7, by bundling metal wire bundles 15 provided in bundles 14 of conductive polymer composite structures, metal wire bundle groups 17 are formed. Methods of fixing groups of metal wire bundles in a state where metal wire bundles are bundled are not specifically limited and such methods may include forming coated films with adhesives and the like around the outer periphery of a group of metal wire bundles or fixing a state where the metal wire bundles are bundled by wrenching metal wire bundles to form a group.

In FIG. 8, groups of bundles 16 of seven conductive polymer composite structures are further bundled, thereby forming bundles 18 of groups of conductive polymer composite structures. By being groups of conductive polymer composite structures, when driven as actuators, by combining groups of bundles of conductive polymer composite structures depending on required electrochemical stress, desired electrochemical stress can be obtained.

Figure 9:
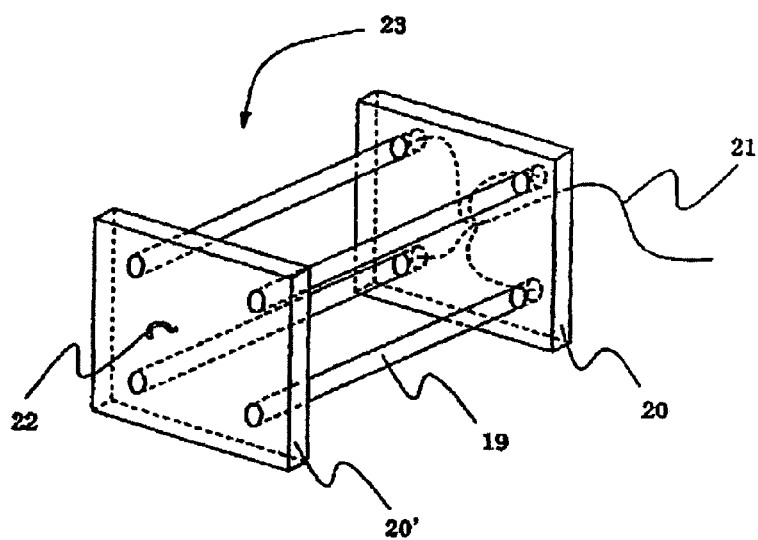
FIG. 9 is a perspective view showing one embodiment of driving member 23 of actuators using bundles of conductive polymer composite structures.

FIG. 9 shows one embodiment of driving members 23 of actuators using said bundles of conductive polymer composite structures. Bundles 19 of four conductive polymer composite structures are fitted in pores provided with fixing members 20 and 20' and are fixed by adhesives and the like. Metal wires provided in bundles of four conductive polymer composite structures form metal wire groups 21 in a bundle, and are connected to a power source interposing a lead. In catching portion 22 provided in fixing member 20', wires and the like positioned in operating objects are connected. Actuators can be formed by impregnating driving members 23 in electrolytic solution, and by coating solid electrolytes and driving members with resins and the like by placing solid electrolytes in a way to make them contact with bundles of conductive polymer composite structures.

By applying voltage to conductive polymer composite structures, conductive polymer composite structures deform and wires and the like connected to catching portions 22 are pulled, thereby making objects move.

In FIG. 9, four of said bundles are positioned in parallel. However, bundles used as driving members of actuators are not specifically limited in numbers used and depending on required electrochemical stress, not less than 100-unit bundle such as about 1000-unit bundle can be used.

In order to use for actuators which are used as large-sized driving devices, it is preferable to use not less than 100-unit bundle for obtaining large electrochemical stress. Regarding alignment of said bundles, tubular, cylindrical and prismatic shapes may be formed, and for example, tubular can be formed by arranging about 600-unit conductive polymer-metal wire composites. In addition, said fixing members can show effect of bundling composites by fixing a position of conductive polymer-metal wire composites and by fixing conductive polymer composite structures to said fixing members.

(Conductive Substrates)

Conductive substrates included in conductive polymer composite structures of the present invention have deformation property and conductive ratio of said conductive substrates is not less than $1.0 \times 10^3$ S/cm. Since said conductive substrates have its conductivity of not less than $1.0 \times 10^3$ S/cm, even when the size of conductive polymer composite structures which include said conductive substrates are made to be large, displacement for practical use such as expansion and contract as actuators becomes available.

Materials of said conductive substrates are not specifically limited as long as they show deformation property and have its conductivity of not less than $1.0 \times 10^3$ S/cm. It is preferable that said materials are metals, metal plated polymer fibers, and carbon materials from the view point of conductivity and mechanical strength. It is preferable that structures of said conductive substrates are structures capable of extending and contracting when conductive substrates have conductive property with conductivity of not less than $1.0 \times 10^3$ S/cm by including non-deformation property materials such as metals and the like. Conductive substrates in which conductive substrates and conductive polymers are complexed, by having stretchable conductive substrates, displacement for practical use such as expansion and contract as actuators becomes available. In addition, said conductive polymer composite structures can have improved mechanical strength since conductive substrates can function as core materials in said conductive polymer composite structures.

Said stretchable structures are not specifically limited as long as they are stretchable. Unlike plate structures or line segment structures, it is preferable that said stretchable structures have structures provided with structures having space between members which compose conductive substrates such as coiled springs, plate springs, and meshes on longitudinal section. As stretchable structures, spring-shaped members, meshed members, fiber structure sheets are exemplified as exemplars.

When said stretchable structures are spring-shaped members, they are not specifically limited as long as they are stretchable and for example, rolled springs, plate springs, coiled springs can be used as conductive substrates.

When said stretchable structures are meshed members, they are not specifically limited as long as they are stretchable and for example, meshed members in which meshed space portions are polygons such as quadrangles, hexagons, octagons and the like can be used. Although said spaced portions are not specifically limited, when expansion and contraction is liable to occur in only one direction due to the shapes, such conductive polymer composite structures can be obtained that can control expansion and contraction in specific directions and when expansion and contraction is liable to occur in several directions such as hexagons and the like due to the shapes, it is preferable to obtain such conductive polymer composite structures that can expand and contract in other directions such as right to left or up and down and the like.

Said meshed members may be the meshed members with a single layer provided with meshed spaced portions represented by metal meshes or they may be the meshed members in which plural of layers provided with meshed spaced portions are stacked. When said spaced portions are hexagons, said meshed members may be honeycomb structures in which spaces are formed in honeycomb.

Further, as said stretchable structures, they may be stretchable fiber structure sheets. As said fiber structure sheets, they may be any one of knitted works, textiles, and non woven cloths and deformation property can be shown depending on sheet structures, yarn characteristics, and yarn structures, however, plain stitches, circular rib stitches, and purl stitches with good deformation property or fiber structure sheets of knitted fabrics by weft knit composed of combinations thereof are preferable since deformation property can easily be obtained.

When the structures of said conductive substrates are spring members or meshed members, conductive substrates may be formed by conductive metals or core materials may be coated with conductive metals by plating and the like. When said conductive substrates are fiber structure sheets, it is preferable that the fibers which make up fiber structure sheets are coated with conductive metals by plating and the like.

Conductive property of conductive substrates included in conductive polymers of the present invention may show conductivity of not less than $1.0 \times 10^3$ S/cm as conductive substrates and the substrates may be composed of conductive materials such as conductive metals, carbons, and the like or surfaces of the substrates may be coated with conductive materials such as conductive metals, carbons, and the like. With the conductivity of not less than $1.0 \times 10^3$ S/cm as said conductive substrates, even when conductive polymer composite structures with enlarged size in the length direction or height direction are used, sufficient potential for displacement such as expansion and contraction can be applied to the whole element. As conductive substrates including conductive metal, metal alloys such as those of Ag, Ni, Ti, Au, Pt, W and the like or other alloys such as SUS and the like can be used. In particular, it is preferable that said conductive substrates include a single substance of metals regarding the element of Pt, W, Ni, Ta and the like in order to obtain conductive polymers with a large expansion and contraction performance, and among them, W alloys and Ni alloys are particularly preferable.

(Conductive Polymers)

As conductive polymers included in conductive polymer composite structures of the present invention, publicly known conductive polymers can be used, which include polypyrrole, polythiophene, polyaniline, polyphenylene, and the like. In particular, it is preferable that said conductive polymers are conductive polymers which include pyrrole and/or pyrrole derivatives in molecular chains not only for stability as conductive polymers but also for excellent electrochemomechanical deformation. In addition, since said conductive polymers show excellent deformation ratio per redox cycle in electrochemomechanical deformation and displacement ratio per specific time, it is preferable that said conductive polymers include anions which include trifluoromethanesulfonate ion and/or plural of fluorine atoms which bond to central atom as dopants.

(Stacked Layer Structures)

The present invention relates to layered structures which include conductive polymer-containing layers and solid electrolyte layers, in which said conductive polymer-containing layers are provided with conductive polymer composite structures which include conductive substrates and conductive polymers, in which said conductive substrates have deformation property and in which conductivity of said conductive substrates is not less than $1.0 \times 10^3$ S/cm. Since said stacked layers include said conductive polymer-containing layers and said solid electrolyte layers, electrolytes in said solid electrolytes are provided in said conductive polymer-containing layers and even when not in liquid electrolytic solution, displacement such as expansion and contract or bending as actuators can be made.

Although it is preferable that said conductive polymer-containing layers in said electrolytes and said solid electrolyte layers directly contact with each other, other layers can be interposed therebetween as long as electrolytes in said solid electrolytes can be made to move to said conductive polymers. For example, in tubular conductive polymer composite structures in FIG. 1, said cylindrical stacked layers may be formed by filling solid electrolytes in a communicated space portions. In addition, by winding the conductive polymer composite structures in FIG. 3 around the outer surfaces of cylindrical solid electrolytes, cylindrical stacked layers may be formed.

(Process for Producing Conductive Polymers)

The present invention relates to a process for producing conductive polymers by electrochemical polymerization using conductive substrates as working electrodes in which said conductive substrates have deformation property and the conductivity of said conductive substrates is not less than $1.0 \times 10^3$ S/cm. By using process for producing conductive polymers of the present invention, conductive polymers are polymerized electrochemically and conductive polymer composite structures can easily be obtained provided with structures in which conductive substrates and conductive polymers are complexed.

In order to easily obtain desired shapes depending on uses, it is preferable that conductive substrates having similar rough contour shapes are used as working electrodes.

For example, cylindrical conductive polymer composite structures can easily be obtained by electrochemical polymerization and without conducting any process by using coiled metal spring-shaped members whose rough contour is cylindrical as conductive substrates.

In the process for producing conductive polymers of the present invention, when coiled spring-shaped members made of metals are used as working electrodes at the time of electrochemical polymerization, cylindrical conductive polymer composite structures can be obtained as shown in FIG. 1. In electrochemical polymerization, by applying voltage to coiled spring-shaped members made of metals which are working electrodes, conductive polymers are polymerized on a wire surface and conductive polymers grow from surfaces of working electrodes. By this growth, as shown in FIG. 2, spaces between wire materials which make up coiled spring members made of metals are filled in and cylindrical conductive polymer composite structures shown in FIG. 1 can be obtained.

FIG. 3 shows conductive polymer composite structures in which metal meshes are used as working electrodes at the time of electrochemical polymerization in the process for producing conductive polymers of the present invention. In electrochemical polymerization, by applying potential to metal meshes which are working electrodes, conductive polymers are obtained on a wire material surface of metal meshes and conductive polymers grow. By this growth, like when coiled springs are used as working electrodes, spaces between wire materials which make up metal meshes are filled in and plate like conductive polymer composite structures shown in FIG. 3 can be obtained.

In the process for producing conductive polymers of the present invention, sizes of conductive substrates used as working electrodes are not specifically limited and large sized conductive substrates may be used such as metal meshes with not less than 50 mm×50 mm and coiled spring-shaped members made of metals whose outer diameters are not less than 3 mm, or small sized conductive substrates may also be used such as coiled spring-shaped members made of metals and the like whose diameter is several dozen μm.

A process for producing conductive polymers of the present invention is a process for producing conductive polymer composite structures which can preferably be used particularly as easily obtaining conductive polymer composite structures available as large sized actuator elements or small-sized actuator elements. In obtaining small sized actuator elements, it is difficult to process conductive polymer films obtained by electrochemical polymerization into actuator elements whose outer diameters or width are less than 1 mm, particularly actuator elements whose diameters are less than 500 μm and it is further difficult to process into cylindrical actuator elements whose outer diameters or width are several dozen μm or less than 100 μm, since conductive polymer films by themselves do not have sufficient mechanical strength during process. However, in the process for producing conductive polymers of the present invention, by selecting conductive substrates beforehand and by conducting the process for producing conductive polymers of the present invention, actuator elements can be obtained which are driven to expand and contract or bend by electrochemomechanical deformation of conductive polymers with outer diameters or width of less than 1 mm without any process in order to obtain desired sizes and shapes of actuator elements in the obtained conductive polymer composite structures.

In addition, regarding large-sized elements as well, when conductive polymers are electrochemically polymerized using large-sized conductive substrates for working electrodes in the process for producing conductive polymers of the present invention, conductive polymer composite structures which can be used as large-sized actuator elements can easily be obtained.

(Condition for Electrochemical Polymerization)

As methods of electrochemical polymerization used in the process of producing conductive polymers, it is possible to use publicly known methods of electrochemical polymerization as electrochemical polymerization of monomers of conductive polymers. Therefore, publicly known electrolytic solution and monomers of conductive polymers can be used and any one of constant potential methods, constant current methods, and potential sweep methods can be used for example, said electrochemical polymerization is preferably conducted under the condition where the current density is 0.01 to 20 mA/cm² and reaction temperature is −70 to 80° C., preferably current density of 0.1 to 2 mA/cm² and reaction temperature of −40 to 40° C., and more preferably, reaction temperature of −20 to 30° C.

In the process for producing conductive polymers of the present invention, although publicly known solvent can be used as electrolytic solution for electrochemical polymerization, electrolytic solution which includes organic compounds as solvents can be used. It is preferable that said organic compounds include (1) chemical bonding selected at least one from the groups of chemical bond made up of ether bond, ester bond, carbon-halogen and carbonate bond and/or (2) functional groups selected at least one from the groups of functional groups made up of hydroxyl groups, nitro groups, sulfone groups, and nitryl groups in molecules.

In addition, publicly known dopant may be included in said electrolytic solution and in order to obtain larger deformation ratio per redox cycle, it is preferable to include trifluoromethanesulfonate ion and/or anions including plural of fluorine atoms bonding to a central atom. Further, in order to make deformation ratio per redox cycle of obtained conductive polymers not less than 16%, as anions in said electrolytic solution, it is preferable to use perfluoroalkylsulfonylimide ion represented by chemical formula (I) instead of using trifluoromethanesulfonate ion and/or anions including plural of fluorine atoms bonding to a central atom.

$$(C_nF_{(2n+1)}SO_2)(C_mF_{(2m+1)}SO_2)N^- \qquad (1)$$

(Here, n and m are Arbitrary Integers.)

In the process for producing conductive polymers of the present invention, monomers of conductive polymers included in electrolytic solution for electrochemical polymerization are not specifically limited as long as they are compounds which become polymers by oxidation by electrochemical polymerization and show conductivity, and examples include five-membered heterocyclic compounds such as pyrrole, thiophene, isothianaphthene and the like and derivatives of alkyl groups, oxyalkyl groups thereof and the like. Among them, hetero five-membered ring compounds such as pyrrole, thiophene and the like or derivatives thereof are preferable and particularly, conductive polymers including pyrrole and/or pyrrole derivatives are preferable for easy production process and stability as conductive polymers. In addition, the above monomers can be used together in combinations of two or more of them.

(Process for Producing Conductive Polymer Composite Structures)

Figure 10:
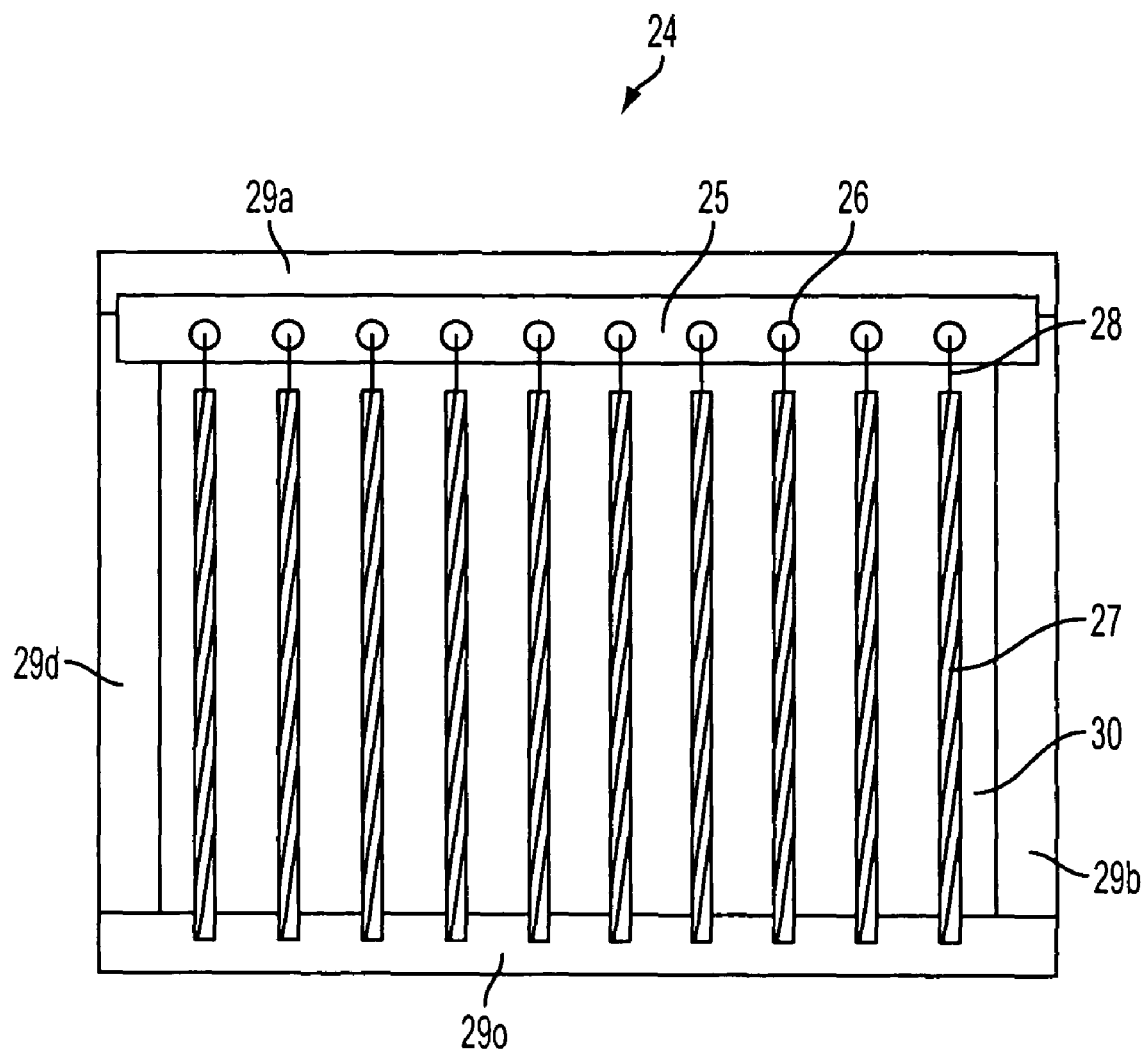
FIG. 10 is a front view of an electrode holder in the producing process of the present invention.

In the process for producing said conductive polymers as above, said conductive polymer composite structures can easily be produced. In particular, it is preferable to use the following process for producing said conductive polymer composite structures. That is, the present invention also relates to a process for producing conductive polymer composite structures comprising the steps of impregnating electrode holders in an electrolytic bath in electrolytic solution, followed by turning on electricity interposing electrolytic solution between a counter electrode and a working electrode and electrochemically polymerizing, thereby obtaining structures in which conductive polymers and conductive substrates are complexed, wherein said holders of working electrodes are provided with working electrodes, a terminal portion of working electrodes and electrode holder portions, and said working electrodes are attached to said terminal portion of working electrodes and said working electrodes include at least coiled conductive substrates. In said producing process, electrochemical polymerization can be conducted by positioning counter electrodes in the vicinity of working electrodes. FIG. 10 is an elevation view of electrode holders 24 in the present invention. Electrode holders 24 are provided with a terminal portion of working electrodes 25 and working electrodes 27 are connected to a terminal portion of working electrodes 25 interposing connection lines 28 in connecting portion 26 of working electrodes.

Ni plates with longer sideways are used as a terminal portion of working electrodes 25. In the process for producing conductive polymer composite structures of the present invention, shapes of a terminal portion of working electrodes are not specifically limited and they may be cylindrical, meshed, and the like. In addition, materials of said terminal portion of working electrodes are not specifically limited as long as they show conductivity and as long as said working electrodes can be set and conductive materials such as metals and non-metals can be used.

In FIG. 10, ten working electrodes are attached to a terminal portion of working electrodes and a working electrode 4 is bundled to form one by twisting four coiled conductive substrates, and plural of working electrodes 27 are positioned in a terminal portion of working electrodes 25, thereby forming a group of working electrodes. When many of said conductive substrates are bundled to form a bundle, electrochemical polymerization may be conducted with one working electrode and compared with when each of many conductive substrates are subject to electrochemical polymerization separately followed by bundling with one electrochemical polymerization process, time can greatly be reduced. In addition, when large-sized actuator elements are to be obtained using conductive polymer composite structures, it is preferable that many of working electrodes are attached to a terminal portion of working electrodes using plural of composites with many coiled conductive substrates bundled for effective process with less time.

It is preferable that said conductive substrates show conductivity of not less than $1.0 \times 10^3$ S/cm and they may be formed by conductive materials such as conductive metals, carbon and the like and the surface of them may be coated with conductive materials such as conductive metals, carbon and the like by plating and the like. With the conductivity of not less than $1.0 \times 10^3$ S/cm as said conductive substrates, even when conductive polymer composite structures with enlarged size in the length direction or height direction are used, sufficient potential for displacement such as expansion and contract can be applied to the whole element. As conductive substrates which include conductive metals, metal such as Ag, Ni, Ti, Au, Pt, Ta, W, and the like or alloys thereof, and other alloys such as SUS and the like can be used. In particular, it is preferable that said conductive substrates are W alloys and Ni alloys in order to obtain conductive polymers which operate stably in operational electrolytic solution.

In the process for producing conductive polymer composite structures of the present invention, said working electrodes may be one coiled conductive substrate with each working electrode or may be bundles in which coiled conductive substrates are bundled. When coiled conductive substrates used as said working electrodes are long, resistance becomes large since metal wires are narrow and long due to coiled conductive substrates which are working electrodes, and as the conductive substrates get longer, transmission of potential gets worse and formation of conductive polymers on conductive substrates becomes difficult. In such cases, by making said working electrodes bundles in which coiled conductive substrates are bundled, at the time of electrochemical polymerization, stable potential can be provided to the whole conductive substrates and the efficiency of electrochemical polymerization improves and time for producing process can be shortened. In addition, since conductive polymer composite structures obtained by electrochemical polymerization using said bundles are in the state where plural of conductive substrates are complexed with conductive polymers in which plural of conductive substrates are bundled together, compared with the process for obtaining conductive polymer composite structures by complexing each of coiled conductive substrates separately, the space of an electrolyte bath can be saved and the same effect can be obtained when many conductive substrates are complexed at once.

In addition, forms of said bundles used as working electrodes are not limited as long as the forms have structures in which motion at the time of expansion and contraction is not inhibited with upward and downward of plural coils of conductive substrates connected to so that plural of coiled conductive substrates contact with each other to make potential substantially constant. For example, forms of said bundles can be selected from bundling coiled conductive substrates like an expander, tubular structures in which coiled conductive substrates are arranged like cylinders, bundling coiled conductive substrates by twisting and the like, depending on how conductive polymer composite structures are used.

Although said bundles are not specifically limited, it is preferable that said bundles are bundles composed of four to one hundred coiled conductive substrates for good workability and efficiency of electrochemical polymerization and such bundles do not inhibit deformation property of conductive polymer composite structures.

When a bundle with over one hundred coiled conductive substrates is used, electrochemical polymerization to coils inside of the bundle is not conducted efficiently. However, when electrolytic solution and coils can contact efficiently with appropriate spaces provided, a bundle with over one hundred coiled conductive substrates can be used.

In FIG. 10, in working electrode 27, connection wire 28 is connected to working electrode terminal portion 25 at working electrode connection portion 26 by soldering in which connection wire 28 is connected to the upper part of working electrode 27 when the lengthwise direction for said electrode 27 is arranged in the vertical direction. In the process for producing conductive polymer composite structures of the present invention, methods of fixing said connection portion of a working electrode are not specifically limited as long as electric conductivity is available by said methods and such methods may be selected from soldering, conductive adhesion, spot welding, clip-on, or screw fastening in which connection wires are fixed by screw heads. For information, said connection wires need not be requisite ones and said working electrodes may be directly connected to a terminal portion of working electrodes and it is preferable that the electrode holders of the present invention are provided with conductive connection wires made of metals in order to facilitate the operation of attaching working electrodes to a terminal portion of working electrodes.

In FIG. 10, electrode holders 24 are provided with plate-like electrode fixing portions 29a, 29b, 29c, and 29d whose thickness is substantially the same and said electrode fixing portions form frame-like shapes. On back surfaces of electrode fixing portions 29a, 29b, 29c, and 29d combined in frame-like shapes, counter electrodes 30 with substantially the same size with frame-shaped outer size formed by said electrode fixing portions are fixed. Since working electrode terminal portions 25 are provided on a face of electrode fixing portion 29a and counter electrodes are fixed on back surfaces of electrode fixing portions, the spaces between counter electrodes in each working electrode become substantially the same and the amount of conductive polymer included in each of obtained conductive polymer composite structures can easily be made substantially constant.

Although the spaces between counter electrodes in each working electrode are not specifically limited as long as conductive polymer can be formed on working electrodes by electrochemical polymerization, the spaces are preferably 1 to 50 mm. When the space between a working electrode and a counter electrode is less than 1 mm, short circuit is liable to occur by the contact of working electrodes and electrodes, and on the other hand, when the space between a working electrode and a counter electrode is larger than 50 mm, voltage becomes too much with constant current methods causing electrolytes to deteriorate, causing performance of generated conductive polymers to lower, and with constant potential methods, electrolytic current becomes extremely small and it takes time to form desired amount of conductive polymers in on working electrodes. Further, in the process for producing conductive polymer composite structures of the present invention, counter electrodes need not always be fixed to holders of working electrodes. Holders of working electrodes may be fixed in the specified position of an electrolytic bath so that the spaces between counter electrodes in each working electrode with said counter electrodes fixed to an electrolytic bath.

In FIG. 10, electrode holders are provided with four electrode fixing portions, however, they are not always plural and any shapes such as all-in one frame shapes may be used so long as they do not block off between counter electrodes and working electrodes. For example, electrode fixing portions having small areas can be obtained and therefore, resource saving is available by providing working electrode terminal portions on plate-shaped electrode fixing portions with long side ways and by fixing them on a specific position of the upper part of an electrolyte bath so that the working electrodes connected to working electrode terminal portions hang vertically downward when counter electrodes are fixed to an electrolytic bath. Further, it is preferable that said electrode fixing portions are formed by insulating materials in order to avoid direct conductivity of counter electrodes and working electrodes and although they may be plastics, ceramics, glasses, and insulating coating metals and the like, polypropylene, PTFE, polyethylene, and glass are more preferably used as easy formation and for good resistance to solvents. In addition, when said electrode fixing portions do not have insulating property, by sandwiching an insulating sheet between working electrode terminal portions and electrode fixing portions or between electrode fixing portions and counter electrodes, direct conductivity of counter electrodes and working electrodes can be avoided.

In the process for producing conductive polymer composite structures of the present invention, the shapes of counter electrodes are not specifically limited as long as conductivity is available between counter electrodes and working electrodes and shapes may be plate-shaped, meshed, coiled, bar-shaped, cylindrical, and the like. In addition, said counter electrodes are not specifically limited as long as they have conductive property and metals such as Ni, Au, Pt, and the like or carbon may be included.

Figure 11:
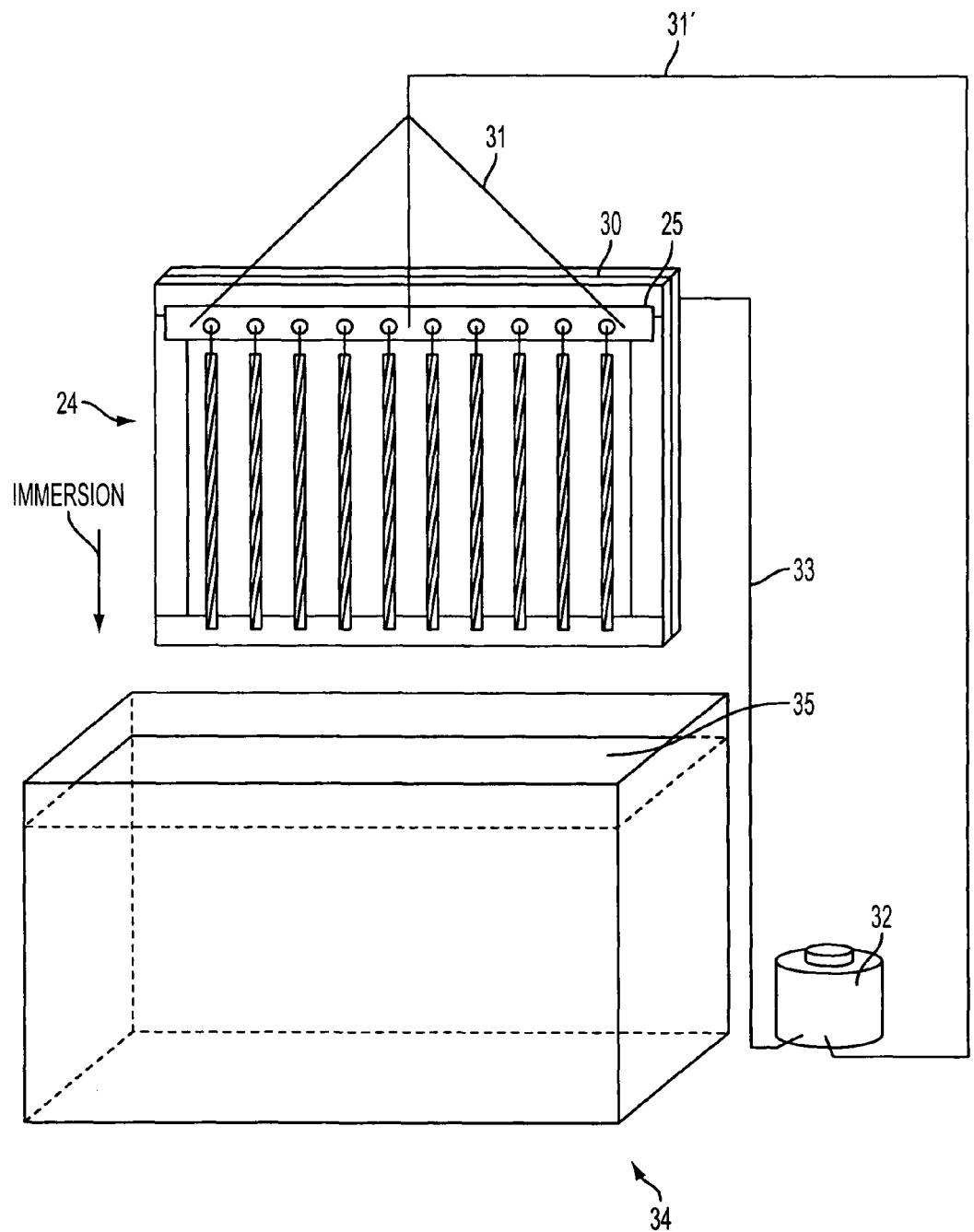
FIG. 11 is a typical perspective view showing the state in which a lead is connected to an electrode holder in the producing process of the present invention.

FIG. 11 shows the state in which a lead for turning on electricity on electrode holders between counter electrodes and working electrodes in the process for producing conductive polymer composite structures of the present invention. Three leads 31 are connected to working electrode terminal portion 25 provided in electrode holders 24 and interposing lead 31', they are connected to power supply 32. Further, leads 10 are also connected to counter electrode 7 and they are also connected to power supply 9. Suspended, electrode holders 24 are impregnated in an electrolytic bath 34 provided with electrolytic solution 35 and electrochemical polymerization is conducted with potential applied by power supply 32. For information, methods for retaining the state of impregnating electrode holders 24 in an electrolytic bath 34 are not specifically limited, and other than methods of suspending electrode holders, methods include inserting electrode holders in an electrolyte bath providing slots, leaving electrode holders in a form of self-standing state such as containing them in a box in an electrolyte bath and the like and various methods can be used which will fit the shapes and sizes of an electrolyte bath. Further, when electrode holders are immersed in an electrolyte bath, it is preferable that whole electrode holders are immersed in an electrolytic solution except working electrode terminal portions so that conductive polymers are not generated on working electrode terminal portions.

In FIG. 11, although leads 31 are connected to working electrode terminal portions 25 in which the space between connecting portions of three leads 31 and working electrode terminal portions 25 are equal so that constant potential can be applied to each portion of the whole working electrode terminal portions 25 which are Ni metal plates, the number of leads which are connected to working electrode terminal portions are not specifically limited in the process for producing conductive polymer composite structures of the present invention.

It is preferable that leads which are connected to said working electrode terminal portions are connected to working electrode terminal portions in required numbers so that stable potential could be provided to the whole working electrode terminal portions depending on materials of working electrode terminal portions. In the process for producing conductive polymer composite structures of the present invention, conductive polymers are generated on plural of working electrodes provided in electrode holders by conducting electrochemical polymerization comprising the steps of impregnating electrode holders in an electrolytic solution, followed by turning on electricity interposing electrolyte between counter electrodes and working electrodes.

(Electrochemomechanical Deformation)

Although in conductive polymer composite structures, supporting electrolytes for electrochemomechanical deformation are not specifically limited, it is preferable that said electrolytic solution includes compounds selected at least one from the group of trifluoromethanesulfonate ion, anions including plural of fluorine atoms which bond to central atom and sulfonate with a carbon number of not greater than 3 as supporting electrolytes. The reason is that by making compounds selected at least one from the group of trifluoromethanesulfonate ion, anions including plural of fluorine atoms which bond to central atom, and sulfonate with a carbon number of not greater than 3 as supporting electrolytes, further large electrochemomechanical deformation per redox can be obtained.

Trifluoromethanesulfonate ion included in electrolytic solution for expanding and contracting said conductive polymer composite structures as operational electrolytic solution is a compound represented by the chemical formula of $CF_3SO_3^-$. Further, anions which include plural of fluorine atoms which bond to central atom is the ion having structures in which plural of fluorine atoms bond to central atom such as boron, phosphorus, antimony, arsenic, and the like. In addition, sulfonate with a carbon number of not greater than 3 are not specifically limited as long as they are salts of sulfonic acid with a carbon number of not greater than 3 and for example, sodium methanesulfonate and sodium ethanesulfonate can be used. Said electrolytic solution may be aqueous solution which includes sodium chloride as supporting electrolytes. By mainly including sodium chloride which is an electrolyte contained in organism, in said electrolytic solution, motion is available in which compatibility between body fluid in organism and said electrolytic solution can easily be made. In addition, regarding, method of electrochemomechanical deformation, electrolytic solution which operates conductive polymers may include

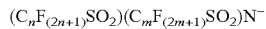
$(C_nF_{(2n+1)}SO_2)(C_mF_{(2m+1)}SO_2)N^-$ (Here, n and m are arbitrary integers) as operational electrolytic solution.

It is preferable that conductive polymer composite structures which include conductive polymers obtained by the process for producing conductive polymers by using electrochemical polymerization, wherein said electrochemical polymerization method uses electrolytic solution which includes perfluoroalkylsulfonylimide ion represented by a chemical formula of $(C_nF_{(2n+1)}SO_2)(C_mF_{(2m+1)}SO_2)N^-$ (Here, n and m are arbitrary integers) are subject to electrochemomechanical deformation with electrolytic solution which includes $(C_nF_{(2n+1)}SO_2)(C_mF_{(2m+1)}SO_2)N^-$ (Here, n and m are arbitrary integers) as an operational electrolyte.

Since said conductive polymer composite structures have the structure in which said perfluoroalkylsulfonylimide is included in operational electrolytic solution, said perfluoroalkylsulfonylimide is easily taken in at the time of expansion of conductive polymer forms in electrochemomechanical deformation, compared with methods of electrochemomechanical deformation which use electrolytes including trifluoromethanesulfonate ion, excellent deformation ratio per redox is shown and further, excellent displacement ratio per specific time is shown.

(Use)

Conductive polymer composite structures and stacked layers of the present invention can preferably be used as actuators since they can generate displacement as mentioned above. In conductive polymer composite structures of the present invention, for example, when they are not coated with resins and the like, they can be used as actuator elements which can be displaced in a linear manner in electrolytic solution. Stacked layers of the present invention, for example, can be used as actuator elements which are displaced in a linear manner when, for example, either one or both of the upper layer and the lower layer in which conductive polymer containing layers are intermediate layers are solid electrolyte layers having the same or greater deformation property at the time of electrochemomechanical deformation of conductive polymer containing layers. Stacked layers of the present invention, for example, can be used as actuator elements which are displaced such as bending when, for example, either one of the upper layer and the lower layer in which conductive polymer containing layers are intermediate layers are solid electrolyte layers or resin layers having smaller deformation property than deformation property at the time of electrochemomechanical deformation of conductive polymer containing layers since solid electrolyte layers or resin layers do not expand or contract greater than conductive polymer layers do. Actuator elements which generate rectilinear displacement or bending displacement can be used as driving parts which generate linear driving force or driving parts which generate driving force for shifting orbital tracks composed of circular arc portions. Further, said actuator elements can also be used as pressing parts which move in a linear manner.

In other words, said actuator elements can preferably be used as driving parts which generate rectilinear driving force, as driving parts which generate driving force for moving on track shaped rails composed of circular arc portions, or as pressing parts moving in a rectilinear manner or in a curved manner in OA apparatuses, antennae, seating devices such as beds or chairs and the like, medical apparatuses, engines, optical equipments fixtures, side trimmers, vehicles, elevating machines, food processing devices, cleaning devices, measuring instruments, testing devices, controlling devices, machine tools, process machinery, electronics devices, electronic microscopes, electric razors, electric tooth brushes, manipulators, masts, play game devices, amusement devices, simulation devices for automobiles, holding devices for vehicle occupants, and expanding devices for accessories in aircrafts. Said actuators can be used as driving parts which generate rectilinear driving force, as driving parts which generate driving force for moving on track shaped rails composed of circular arc portions, or as pressing parts moving in a rectilinear manner in, for example, valves, brakes, and lock devices used as machinery as a whole including the above mentioned instruments such as OA apparatus, measuring instruments, and the like. Further, other than said devices, instruments, and machines, in mechanical components as a whole, said actuators can preferably be used as driving parts of positioning devices, driving parts of posture control devices, driving parts of elevating devices, driving parts of carriers, driving parts of moving devices, driving parts of regulating devices for the content amount, directions, or the like, driving parts of adjusting devices of axes and the like, driving parts of guiding devices, and as pressing parts of pressing devices. In addition, said actuators, as driving parts in joint devices, can preferably be used as driving parts which impart revolving movement to joint portions or joints where direct driving is applicable such as joint intermediate members and the like. Said actuator elements of the present invention can preferably be used as driving parts of changeover devices for wires and the like, driving parts of reversing gears for products and the like, driving parts of winding devices for wires and the like, driving parts of traction apparatuses, and driving parts of swing devices in horizontal directions such as oscillation and the like.

Said actuator elements of the present invention can preferably be used, for example, as driving parts of ink jet parts in ink jet printers such as printers for CAD and the like, driving parts for displacing the direction of optical axis of said optical beam in the printer, head driving parts of disc drive devices such as external storage devices and the like, and as driving parts of pressing contact force regulating means of paper in feeders of image forming devices which include printers, copying machines, and facsimiles.

Said actuator elements of the present invention can preferably be used, for example, as driving parts of a drive mechanism relocating measuring portions or feeding portions making high frequency power feeding portion such as antennae shared between the frequencies for radio astronomy move to second focal point, and driving parts for lifting mechanism in masts used for example for vehicle-loaded pneumatic operating stretchable masts (telescoping masts) and the like or antennae.

Said actuator elements of the present invention can preferably be used, for example, as driving parts of massaging parts of chair-shaped massagers, driving parts of nursing beds or medical beds, driving parts of posture control devices of electrically reclining chairs, driving parts of stretching rods controlling sitting up and down movement of backrest and ottoman of reclining chairs used as massager, comfort chairs and the like, driving parts used as backrests for reclining chairs in nursing beds or leg rests in furniture on which people place some body portions or driving parts used as rotation drive and the like of nursing beds, and driving parts for controlling posture of uprising chairs.

Said actuator elements of the present invention can preferably be used, for example, as driving parts of testing devices, driving parts of pressure measuring devices for blood pressure and the like used as external blood treatment apparatus, driving parts for catheters, endoscopes, device or something, tweezers, and the like, driving parts of cataract operation devices using ultrasonic, driving parts of movement devices such as jaw movement devices and the like, driving parts of means for relatively deforming members of chassis of hoists for sickly weak people, and driving parts for elevation, moving, posture control, and the like of nursing beds.

The actuators of the present invention can preferably be used as, for example, driving parts of vibration-control devices for decreasing vibration transmitted from vibration generating parts such as engines and the like to vibration receivers such as frames and the like, driving parts of valve train devices for intake and exhaust valves of internal combustion engine, driving parts of fuel-control devices of engines, and driving parts of fuel-providing systems of engines such as diesel engines, and the like.

Said actuator elements of the present invention can preferably be used as, for example, driving parts of calibration devices of imaging devices with compensation function for blurring of images due to hand movement, driving parts of lens driving mechanism of lens for home video camera, and the like, driving parts of driving mechanism of mobile lenses of optical devices such as still cameras, video cameras, and the like, driving parts of automatic focus parts of cameras, driving parts of lens-barrel used as image-taking devices of cameras, video cameras, and the like, driving parts of automatic guiders which take in the light of optical telescopes, driving parts of lens driving mechanism or lens-barrel of optical devices having two optical systems such as stereoscopic cameras, binoculars, and the like, driving parts or pressing parts providing compressing force to fibers of wavelength conversion of fiber-type wavelength tunable filters used as optical communication, optical information processing and for optical measuring and the like, driving parts of optical axis alignment devices, and driving parts of shutter mechanism of cameras.

Said actuator elements of the present invention can preferably be used as, for example, pressing parts of fixtures for caulking hose clips to hose bodies.

Said actuator elements of the present invention can preferably be used as, for example, driving parts of coil springs and the like of automobile suspensions, driving parts of fuel filler lid openers which unlock fuel filler lid of vehicles, driving parts of stretching and retraction of bulldozer blades, driving parts of driving devices for changing gear ratios of automotive transmissions automatically, or for disengaging and engaging clutches automatically.

Said actuator elements of the present invention can preferably be used as, for example, driving parts of elevating devices of wheel chairs with seat plate elevation devices, driving parts of elevation devices for eliminating the level difference, driving parts of elevation transfer equipment, driving parts for elevating medical beds, electric beds, electric tables, electric chairs, nursing beds, elevation tables, CT scanners, cabin tilt devices for trucks, lifters, and the like, each kind of elevation machine devices and driving parts of loading and unloading devices of special vehicles for carrying heavy materials.

Said actuator elements of the present invention can preferably be used as, for example, driving parts of discharge amount controlling mechanism such as nozzle devices for food discharge used in food processing devices, and the like.

Said actuator elements of the present invention can preferably be used as, for example, driving parts for elevating and the like of a carriage of cleaning devices, cleaning parts and the like.

The actuators of the present invention can preferably be used as, for example, driving parts of measuring parts of three dimensional measuring devices measuring surface shape, driving parts of stage devices, driving parts of sensor parts of such systems as detecting operating characteristics of tires, driving parts of initial speed-imparting devices of evaluation equipment of impact response of force sensors, driving parts of piston driving devices of piston cylinders of devices for testing water-permeability hole, driving parts for aiming in the direction of elevation angles in condensing and tracking type power generating equipments, driving parts of vibrating devices of tuning mirrors of sapphire laser oscillation wavelength switching mechanism for measuring devices which include measuring devices for gas concentration, driving parts of XY θ table when alignment is required in testing devices of printed circuit boards or in testing devices of flat panel displays such as liquid crystals, PDPs and the like, driving parts of adjustable aperture devices used in charged particles beam systems and the like such as electronic beam (E beam) systems, focused ion beam (FIB) systems, and the like, driving parts of supporting devices of elements under test or sensing parts in flatness measuring devices, and driving parts of precisely positioning devices such as microscopic device assembly, semi-conductor photolithography machines, semi-conductor inspecting devices, three dimensional measuring devices, and the like.

Said actuator elements of the present invention can preferably be used as, for example, driving parts of electric razors, and driving parts of electric toothbrushes.

Said actuator elements of the present invention can preferably be used as, for example, driving parts of imaging devices of three dimensional objects, driving parts of optical devices for optical system adjusting focal depth for reading out commonly used as CDs and DVDs, driving parts of variable mirrors capable of easily varying focal positions by changing the shape of a surface subject to drive by plural of actuators as active curved surfaces to approximately form a desirable curved surface, driving parts of disc devices capable of moving move units in a rectilinear manner having at least one magnetic head such as optical pick up devices and the like, driving parts of head load mechanisms of magnetic tape head actuator assembly such as linear tape storage systems and the like, driving parts of image-forming devices applied for electronograph copying machines, printers, facsimiles, and the like, driving parts of loaded members such as magnetic head members, and the like, driving parts of optical disc exposure devices which drive and control focusing lens groups in the direction of optical axis, driving parts of head driving means which drive optical heads, driving parts of information recording and reproducing devices which record information on record media or play information recorded on record media, and driving parts for switching operations of circuit breaker (circuit breaker for power distribution).

Said actuator elements of the present invention can preferably be used as driving parts of the following devices, for example, driving parts of press molding and vulcanizing devices for rubber compositions, driving parts of parts arrangement devices which arrange delivered parts in single rows or in single layers, or arrange said parts in desired posture, driving parts of compression molding devices, driving parts of holding mechanism of welding devices, driving parts of bag filling and packaging machines, driving parts of machine tools such as machining centers and the like, molding machines such as injection molding machines, press machines, and the like, driving parts of fluid coating devices such as printing devices, coating devices, lacquer spraying devices, and the like, driving parts of manufacturing devices which manufacture camshafts and the like, driving parts of hoisting devices of covering materials, driving parts of selvedge control elements and the like in shuttle-less looms, driving parts of needle drive systems of tufting machines, looper driving systems, knife driving systems, and the like, driving parts of cam grinders or polishing devices which polish parts such as ultra precision machining tools, driving parts of break devices of harness frames of looms, driving parts of opening devices which form opening portions of warp threads for weft thread insert in looms, driving parts of peeling devices of protection sheets of semi-conductor substrates and the like, driving parts of threaders, driving parts of assembly devices of electron guns for CRT, driving parts of linear control devices with shifter fork drive selection of Torchon lace machines for manufacturing Torchon lace having applied uses for welt for clothes, table cloths, sheet coverings, and the like, driving parts of horizontal moving mechanisms of anneal window driving devices, driving parts of support arms of glass melting kiln forehearth, driving parts of making forward and backward movement for rack of exposure devices of fluorescent screen forming methods of color TV tubes and the like, driving parts of torch arms of ball bonding devices, driving parts of bonding heads in XY directions, driving parts of mounting processes of parts or measuring inspection processes of parts in mounting chip parts or measuring using probes, elevation driving parts of cleaning supports of board cleaning devices, driving parts of making probe heads scanning on glass board forward or backward, driving parts of positioning devices of exposure devices which transcribe patterns on boards, driving parts of microscopic positioning devices with sub micron orders in the field of high precision processes, driving parts of positioning devices of measurement devices of chemical mechanical polishing tools, driving parts for positioning stage devices preferable for exposure devices or scanning exposure devices used at the time of manufacturing circuit devices such as conductor circuit elements, liquid crystal display elements, and the like in lithography processes, driving parts of means of carrying works and the like or positioning works and the like, driving parts for positioning or carrying such as reticle stages or wafer stages and the like, driving parts of stage devices for precisely positioning in chambers, driving parts of positioning devices of work pieces or semi-conductor wafers in chemical mechanical polishing systems, driving parts of stepper devices of semi-conductors, driving parts of devices precisely positioning in guiding stations of processing machines, driving parts of vibration-control devices of passive vibration-control and active vibration-control types for each kind of machine represented by machine tools and the like such as NC machines, machining centers, and the like, or steppers in IC industry, driving parts of displacing reference grids board of light beam scanning devices in the direction of optical axis of said light beam in exposure devices used as lithography process for manufacturing semi-conductor elements or liquid crystal display elements and the like, and driving parts of transfer devices transferring into item processing units in the traverse direction of conveyors.

Said actuator elements of the present invention can preferably be used as, for example, driving parts of positioning devices of probes of scanning probe microscopes such as electron microscopes and the like, and driving parts of positioning and the like of micro-motion devices for sample in electron microscopes.

Said actuator elements of the present invention can preferably be used as, for example, driving parts of joint mechanisms represented by wrists and the like of robot arms in robots including auto welding robots, industrial robots, robots for nursing care or manipulators, driving parts of joint other than direct drive type, fingers of robots, driving parts of motion converting mechanisms of slide retractable zipper devices used for fingers of robots, hands of robots and the like, driving parts of micro manipulators for operating microscopic objects in any state in cell minute operations or in assembly operation of microscopic parts and the like, driving parts of artificial limbs such as electric artificial arms and the like having plural of fingers which can freely open and close, driving parts of robots for handling, driving parts of assistive devices, and driving parts of power suits.

Said actuator elements of the present invention can preferably be used as, for example, pressing parts of the devices pressing upper rotary blades, lower rotary blades, or the like of side trimmers.

Said actuator elements of the present invention can preferably be used as, for example, driving parts of generators and the like in play devices such as for pachinko games and the like, driving parts of amusement devices such as dolls, pet robots, and the like, and driving parts of simulation devices of those for automobiles.

Said actuator elements of the present invention can preferably be used as, for example, driving parts of valves used as machines in general including the above instruments and the like, and for example, said actuators can preferably be used as driving parts of valves of re-condensers of vaporized helium gas, driving parts of bellows type pressure sensitive control valves, driving parts of opening devices which drive harness frames, driving parts of vacuum gate valves, driving parts of control valves of solenoid operations for liquid pressure systems, driving parts of valves with movement transmitting devices using pivot levers built in, driving parts of valves of movable nozzles of rockets, driving parts of suck back valves, and driving parts of regulator valves.

Said actuator elements of the present invention can preferably be used as, for example, pressuring parts of brakes used as machines in general including the above mentioned instruments and the like, and for example, pressuring parts of control devices which are preferably used as brakes for emergency, security, stationary, and the like, and pressuring parts of brake structures and brake systems.

Said actuator elements of the present invention can preferably be used as, for example, pressuring parts of lock devices used as machines in general including the above mentioned instruments and the like and for example, pressuring parts of mechanical lock devices, pressuring parts of steering lock devices for vehicles, pressuring parts of power transmission devices which have both load shedding mechanisms and connection releasing mechanisms.

Said actuator elements of the present invention can preferably be used as, for example, pressuring parts of brakes used as machines in general including the above mentioned instruments, and pressuring parts of control devices which are preferably used as brakes for emergency, security, stationary, and the like, and pressuring parts of brake structures and brake systems.

Said actuator elements of the present invention can preferably be used as, for example, pressuring parts of lock devices used as machines in general including the above mentioned instruments and the like and for example, pressuring parts of mechanical lock devices, pressuring parts of steering lock devices for vehicles, pressuring parts of power transmission devices which have both load shedding mechanisms and connection releasing mechanisms.

Since said actuator elements are light weighted, are composed of simple device structures, and are less likely to generate displacement disadvantageous to press motion such as buckling and the like and further, since said actuators can easily generate pressing force, they can preferably be used as pressuring parts of audio-visual devices, tactile devices, pressing devices, gripping devices, push-out devices, bending devices, clamping devices, adhesion devices, or contact devices.

Said actuator elements of the present invention can preferably be used as pressing parts of the following devices; audio-visual devices or tactile devices for visually or aurally handicapped persons in which pressing parts form Braille, pressing parts of flexible variable endoscopes, pressing parts of front fork for two-wheeled vehicle, pressing parts which shuts off opening portions of high-frequency wave orifice passage in pneumatic controlling fluid enclosing type vibration proofing device, pressing parts for pressing valve axis end portions in valve resting device for cylinder control type engines, pressing parts which press contacts plate members in injection molding devices into dies, pressing parts which pressurizes image elements towards said lens seats in image devices such as television cameras, video cameras, digital cameras, and the like, pressing parts which unlock retention of recording medium by pressing chuck claws in information reproducing mechanism provided with clamping mechanism, pressing parts for bias application (including ground) for allowing conductivity to conductive substrates locally in electrolytic driven image displaying medium, pressing parts which drives and presses in the propulsive direction in base pushing devices for shield tunneling methods, pressing parts used as transporting means in image forming devices, and pressing parts which press-contacts filmy polishing members to plate members in polishing devices in plate members.

Said actuator elements of the present invention can preferably be used for the pressing parts of the following devices; pressing parts which presses movable spring plates in the direction of contacting fixed contact in electromagnetic relay, pressing parts of speed reduction mechanism with great speed reduction ratio built in NC machine tools and the like, pressing parts for molding hollow members with specific shapes by contacting and pressing to stock pipes in processing devices of hollow products for spinning process, pressing parts for holding by pressing cylindrical articles between the plate type holding members in the holding device of cylindrical articles and pressing parts, pressing parts for pressing masking plates in leakage testing devices measuring the amount of leakage of boring holes bored in cylinder blocks and the like, pressing part for pressing flexible tubes in tube pumps preferably used as discharging liquid in constant amount little by little, pressing parts for transmitting driving force from the engine to front wheels or rear wheels with distribution ratio depending on specific pressing force by pressing multi-plate clutches with specific pressing force in driving force distributing devices which transmit driving force from the engines to front wheels and rear wheels with the specific distribution ratio, pressing parts of pusher pressing units in coil inserting devices, pressing parts for separating the end portion of seal parts in releasing devices of adhesive seal parts from said release paper, pressing parts for pressurizing said supporting arms by pressing said locking parts in dancer roller devices which control transfer tension of sheet materials.

Said actuator elements of the present invention can preferably be used as pressing parts which can press driven side clutch claws to driving side clutch claws in planting parts of rice transplanters, pressing parts of fixed platens which presses substantially center portion of hot plates in hot press devices for obtaining laminates, lead pressing parts forming bending portions of a lead in lead forming equipment of semi-conductor devices, pressing parts which press detection levers for detecting the position of disc trays in disc tray position detecting mechanisms, pressing parts making film pressing plates tightly adhere in film carriers which scan images, and pressing parts which operate boring augers for boring new strainer holes on a pipe wall in construction devices of function regeneration method of underground water collecting and draining pipes.

In addition, other than for the use of pressing parts of the above devices, actuator elements can be used as shatter positioning devices, boring work devices, provided with boring bars, laser welding devices, apparatus for extruding fish paste products, video tape cassettes, transmission devices for industrial vehicles, tabular body end part fixing devices, painting apparatus for reinforcing materials and repairing materials of concrete structures, folding and laminating devices of sheets, paper delivery devices, driving devices of moving objects, printers, electric circuit cut off devices, heating devices with temperature detecting unit, liquid crystal display devices, image forming devices, recorders, bread slicers, tools for two-shaft concurrent fastening, powder molding devices, paper sheet handlers, fixing devices of seamless belts, optical fiber connecting devices, shatter mechanisms of vacuum press devices, image blur correcting devices, image scanning devices, medium housing mechanisms, label adhering devices, stencil printing devices, press processing devices, deburring devices for outer periphery of the work, disc devices, cutter mounting structures, prize-winning devices for game machines, apparatus for loading wafer carrier containers, molds for partially bonding interior trim, drawing frames, clamp devices, measuring apparatus, heat treating furnaces, oil pumps, bending devices, motor with position switch, carrying devices for partition panels, and cam shaft material supporting devices.

EXAMPLES

Hereinafter, Examples and Comparative Examples are shown, however, the present invention is not limited to these Examples and Comparative Examples.

Example 1

Electrolytic solution was prepared by dissolving pyrrole which is a monomer and a dopant ion salt as shown in Table 1 into medium stated in Table 1 by a publicly known stirring method. This electrolytic solution has monomer concentration of 0.25 mol/l and the dopant salt in Table 1 is 0.5 mol/l. Conductive polymer composite structures of Example 1 having the shapes shown in Table 1 were obtained by using this electrolytic solution and by conducting electrochemical polymerization with constant current methods with the current density of 0.2 mA/cm² by setting working electrodes and counter electrodes. As said working electrodes, conductive substrates shown in Table 1 (metal mesh, trade name "Au Ami 0.1 mm φ, 100 mesh", manufactured by Tokuriki Honten Co., Ltd) were used. As said counter electrodes, commercially available Pt electrodes were used. In addition, in the tables, "-" shows that there were no appropriate matters.

Example 2

Conductive polymer composite structures of Example 2 were obtained in the same way as in Example 1, except that conductive substrates of Table 1 (metal mesh, Ni mesh (0.05 mm φ, 200 mesh) manufactured by Rare Metallic Co., Ltd.) were used.

Examples 3 to 8

Conductive polymer composite structures of Examples 3 to 8 were obtained in the same way as in Example 1, except that conductive substrates which were coiled spring members of Tables 1 and 2 were used and that the solvent and dopant salt of Table 1 or 2 were used. In addition, as coiled spring members used in Example 3, spring members formed as a characteristic of Table 1 were used by using "Ni wire, wire diameter 0.10 mm φ" (manufactured by Rare Metallic Co., Ltd.) and as coiled spring members used in Example 4, trade name "SUS/Ni plated coil, outer diameter 0.5 mm φ, wire diameter 40 mm φ, pitch 110 μm" (manufactured by Nippon cable system Inc.) were used. As coiled spring members used in Example 5, "Pt/w coil, outer diameter 0.5 mm φ, wire diameter 40 μm φ, pitch 110 μm" (manufactured by Nippon cable system Inc.) were used. And in Examples 6 and 8, "W coil, outer diameter 0.25 mm φ, wire diameter 0.03 mm, pitch 60 μm" (manufactured by Nippon cable system Inc.) were used. In Example 7, trade name "Inconel X750" was used.

Comparative Examples 1 to 4

Pyrrole which is a monomer and dopant ion salt stated in Tables 1 or 2 were dissolved in solvent stated in Tables 1 or 2 by a publicly known stirring method and an electrolytic solution in which monomer concentration is 0.25 mol/l and concentration of dopant ion salt in Tables 1 or 2 of 0.5 mol/l was prepared. To this electrolytic solution, ITO electrode plates were used as working electrodes. Pt electrodes were used as counter electrodes, and by conducting electrochemical polymerization employing constant current method if polymerization current density of 0.2 mA/cm², conductive polymers were obtained on working electrodes. Further, by stripping off obtained conductive polymers from ITO electrode plates, filmy conductive polymer films were obtained.

"-" in the Tables shows that there is no appropriate matter. In the Tables, DME shows 1,2-dimethoxyethane and TBABF₄ shows tetrabutylammonium tetrafluoroborate. Conductivity of conductive polymer composite structures and of conductive polymer films were measured by using a conductivity measuring machine (four-probe measuring method, trade name "low-resistivity measuring machine Loresta-GP" manufactured by Mitsubishi Chemical Corporation)

TABLE 1

|  |  | Example | | | | | Comparative Example | |
|---|---|---|---|---|---|---|---|---|
|  |  | 1 | 2 | 3 | 4 | 5 | 1 | 2 |
| conductive substrate | material | Au | Ni | Ni | SUS/Ni plate | Pt | — | — |
|  | shape | mesh | mesh | coil | coil | coil | — | — |
|  | opening (mesh) | 100 | 200 | — | — | — | — | — |
|  | Pitch (μm) | — | — | 200 | 110 | 110 | — | — |
|  | coil outer diameter | — | — | 3 | 0.5 | 0.5 | — | — |
|  | wire diameter (mm) | 0.10 | 0.05 | 0.10 | 0.04 | 0.04 | — | — |
|  | conductivity (S/cm) | $4 \times 10^5$ | $3 \times 10^4$ | $1 \times 10^5$ | $1 \times 10^4$ | $1 \times 10^5$ | — | — |
| electrolyte | solvent | DME | DME | DME | DME | DME | DME | DME |
|  | dopant salt | TBABF₄ | TBABF₄ | TBABF₄ | TBABF₄ | TBABF₄ | TBABF₄ | TBABF₄ |
| element | form | polymer composite structures | polymer composite structures | polymer composite structures | polymer composite structures | polymer composite structures | conductive polymer film | conductive polymer film |
|  | shape | filmy | filmy | cylindrical | cylindrical | cylindrical | filmy | filmy |
|  | length of elements (mm) | 50 | 50 | 50 | 50 | 50 | 15 | 50 |
|  | conductivity (S/cm) | $5 \times 10^4$ | $5 \times 10^3$ | $1 \times 10^3$ | $1 \times 10^3$ | $6 \times 10^3$ | $1 \times 10^2$ | $1 \times 10^2$ |
| deformation property | supporting electrolyte | NaPF₆ | NaPF₆ | NaPF₆ | NaPF₆ | NaPF₆ | NaPF₆ | NaPF₆ |
|  | suitability for deformation | ○ | ○ | ◎ | ◎ | ◎ | ◎ | Δ |

TABLE 2

| | | Example | | | Comparative Example | |
|---|---|---|---|---|---|---|
| | | 6 | 7 | 8 | 3 | 4 |
| conductive substrate | material | W | Inconel X750 | W | — | — |
| | shape | coil | coil | coil | — | — |
| | opening (mesh) | — | — | — | — | — |
| | pitch (μm) | 60 | 60 | 60 | | |
| | coil outer diameter | 0.25 | 0.25 | 0.25 | | |
| | wire diameter (mm) | 0.03 | 0.03 | 0.03 | — | — |
| | Conductivity (S/cm) | $2 \times 10^5$ | $1 \times 10^4$ | $2 \times 10^5$ | — | — |
| Electrolyte | solvent | methyl benzoate | methyl benzoate | methyl benzoate | methyl benzoate | methyl benzoate |
| | dopant salt | $TBABF_4$ | $TBABF_4$ | $TBACF_3SO_3$ | $TBABF_4$ | $TBABF_4$ |
| Element | form | polymer composite structure | polymer composite structure | polymer composite structure | conductive polymer film | conductive polymer film |
| | shape | cylindrical | cylindrical | cylindrical | filmy | filmy |
| | length of elements (mm) | 50 | 50 | 50 | 15 | 50 |
| | Conductivity (S/cm) | $3 \times 10^4$ | $1 \times 10^3$ | $3 \times 10^3$ | $1 \times 10^2$ | $1 \times 10^2$ |
| deformation property | supporting electrolyte | $NaBF_4$ | $NaBF_4$ | $NaBF_4$ | $NaBF_4$ | $NaBF_4$ |
| | suitability for deformation | ⊚ | ⊚ | ⊚ | ○ | Δ |

TABLE 3

| | Example | | Comparative Example | | | |
|---|---|---|---|---|---|---|
| | 1 | 2 | 1 | 2 | 3 | 4 |
| mechanical strength (MPa) | 53 | 111 | 17 | 17 | 39 | 39 |

(Evaluation)

[Deformation Property]

Elements with the length stated in Table 1 were obtained using conductive polymer composite structures of Examples 1 to 8 and conductive polymer films stated in Comparative Examples 1 to 4. Said elements were held in electrolytic solution by dissolving them in water to make supporting electrolytes stated in Table 1 be 1 mol/l, thereby measuring deformation ratio per redox cycle by the method below. Width of elements obtained from conductive polymer composite structures in Examples 1 and 2 and from conductive polymer films in Comparative Examples 1 to 4 was set to be 2 mm.

Elements obtained from conductive polymer composite structures in Examples 1 to 8 and elements obtained from conductive polymer films in Comparative Examples 1 to 4 were prepared as operational electrodes and operational electrodes were held in said electrolytic solution. Operational electrodes were prepared out of elements which were obtained from the conductive polymer composite structures of Examples 1 to 8 and from the conductive polymer films of Comparative Examples 1 to 4, and the operational electrodes were held in said electrolyte. Counter electrodes were prepared out of Pt electrodes and potential was cycled (between −0.9 V and +0.7 V vs. Ag/Ag$^+$) by connecting each terminal portion of the electrodes to the power supply interposing a lead therebetween thereby measuring the electrochemomechanical deformation (change in length). Difference of deformation (electrochemical strain) obtained by expansion and contract of operational electrodes by the application of one cycle (per redox cycle) was evaluated based on the following criteria. The results are shown in Tables 1 and 2.

[Evaluation Criteria of Deformation Property]

⊚: Excellent in deformation ratio and excellent in deformation property as actuator elements.

○: Good in deformation ratio with deformation property practically used as actuator elements.

Δ: Poor in deformation ratio and not suitable for practical use as actuator elements.

x: No deformation

[Mechanical Strength]

Mechanical strength (tensile strength) of conductive polymer composite structures in Examples 1 and 2 and conductive polymer film of Comparative Examples 1 to 4 having similar shapes were measured using trade name "Digital gauge 9810" (manufactured by AIKOH ENGINEERING CO., LTD). The results are shown in Table 3.

[Result]

Elements obtained from conductive polymer composite structures in Examples 1 and 2 were filmy elements longer than that of elements in Comparative Example 1 (15 mm) showed deformation property which can be practically used as actuator elements. On the other hand, in the elements in Comparative Example 2 which are conductive polymer films, although element sizes of Examples 1 and 2 were the same, they were not practically used as actuator elements due to poor deformation property since conductive substrates were not included. Further, regarding elements of Comparative Example 1, although they showed good deformation property and were excellent as actuator elements, since they were small in size which is conventional, they were not suitable for the use of large actuators.

Although elements obtained from conductive polymer composite structures in Examples 3 to 8 were cylindrical elements longer than that of Comparative Example 1 (16 mm), since it included conductive substrates, they showed excellent deformation property equivalent to deformation property of elements in Comparative Example 1 and they were also excellent as actuators.

Conductive polymer composite structures in Examples 1 to 8 have conductivity of not less than $1 \times 10^3$ S/cm and compared with the conductivity of conductive polymer film in Comparative Examples 1 and 2, the conductivity is 10 times larger. For this reason, when conductive polymer composite structures of the present invention are used as actuator elements, actuator elements are capable of imparting potential large enough to make displacement such as expansion and contraction and the like all over it even when the size thereof is enlarged and therefore, they are practical enough to be used as actuator for large uses such as driving parts of robot hands and the like.

Conductive polymer composite structures in Examples 1 and 2 showed excellent mechanical strength of 53 MPa and 111 MPa. On the other hand, mechanical strength of conductive polymer films in Comparative Examples 1 and 2 was 17 MPa. In conductive polymer composite structures in Examples 1 and 2, about as 3 times and 7 times as large mechanical strength was shown compared with conductive polymer films in Comparative Examples 1 and 2 with the same shapes (filmy) and the mechanical strength was greatly improved.

In addition, regarding Comparative Example 3, when the length of elements is 15 mm, deformation property is excellent. However, when the elements are elongated using the conductive polymers with the same composition as in Comparative Example 3, as shown in Comparative Example 4 respectively, deformation characteristics lower. In addition, regarding Comparative Examples 3 and 4, mechanical strength is also extremely low compared with that of Comparative Examples 1 and 2 whose shapes are filmy and therefore similar. Therefore, Examples 1 and 2 have excellent deformation property and mechanical strength compared with conductive polymer films shown in Comparative Examples 1 to 4.

In addition, in conductive polymer composite structures of Examples 1 to 8, since conductive polymers are formed on surfaces of wire materials which compose conductive substrates, by using conductive substrates having a thickness, an outer diameter and a width which are thinner by the thickness of conductive polymers formed on conductive substrates, actuator elements can easily be obtained which are driven to make expansion and contraction or bending motion by electrochemomechanical deformation of conductive polymers whose outer diameter or width is less than 1 mm.

Industrial Applicability

Used for actuator elements, conductive polymer composite structures of the present invention are capable of making satisfactory displacement such as expansion, contraction, and the like as large sized actuators as well compared with conventional conductive polymer elements and since they can be driven for practical uses, they are preferably used as large sized actuators such as robot hands, artificial muscles and the like. In particular, the conductive polymer composite structures of the present invention can preferably be used as driving parts of positioning devices, posture control devices, elevating devices, carrier devices, moving devices, regulating devices, adjusting devices, guiding devices, joint devices, changeover devices, reversing gears, winding devices, traction apparatuses, and swing devices and pressing parts of pressing devices, pressurizing devices, gripping devices, push-out devices, bending devices, clamping devices, adhesion devices, and contact devices.

Conductive polymer composite structures of the present invention include conductive substrates and conductive polymers and when said conductive substrates are consecutive structures and are included in almost all of the said conductive polymer composite structures, small sized actuators with the outer diameter or width of less than 1 mm can be produced, which is hard to be produced when conductive polymers alone are used. Further, said conductive polymer composite structures can produce actuator elements whose diameter is less than 500 μm and smaller actuator elements with dozens micron diameters such as 100 μm can also be produced.

In addition, since the process for producing conductive polymers of the present invention can easily give conductive polymer composite structures, it is preferable for process for producing conductive polymers.

What is claimed:

1. Actuator elements comprising conductive substrates and conductive polymers,
    wherein said conductive substrates have a stretching property, said conductive substrates are in the form of coiled spring-type members, meshed members or fiber structure sheets,
    the conductivity of said conductive substrates is not less than $1.0 \times 10^3$ S/cm,
    electrochemomechanical deformation of said conductive polymers allows expansion and contraction or bending of said actuator elements,
    said conductive substrates are used as working electrodes,
    said conductive polymers are directly formed on said working electrodes by electropolymerization,
    wherein the conductive polymers fills spaces between the conductive substrates.

2. Actuator elements comprising layered structures containing conductive polymer-containing layers and solid electrolyte layers,
    wherein said conductive polymer-containing layers are provided with conductive polymer composition structures containing conductive substrates and conductive polymers,
    said conductive substrates are used as working electrodes,
    said conductive polymers are directly formed on said working electrodes by electropolymerization,
    said conductive substrates have a stretching property, said conductive substrates are in the form of coiled spring-type members, meshed members or fiber structure sheets,
    and the conductivity of said conductive substrate is not less than $1.0 \times 10^3$ S/cm,
    electrochemomechanical deformation of said conductive polymers allows expansion and contraction or bending of said actuator elements, and
    wherein the conductive polymers fill spaces between the conductive substrates.

3. Actuator elements comprising bundles provided with not less than two conductive polymer composite structures of claim 1, which are conductive polymer composite structures.

4. The actuator elements according to claim 3, wherein said conductive polymer composite structures are cylindrical bodies.

5. The actuator elements according to claim 1, wherein said conductive substrates are in the form of coiled spring-type members.

6. The actuator elements according to claim 2, wherein said conductive substrates are in the form of coiled spring-type members.

7. The actuator elements according to claim 3, wherein said conductive substrates are in the form of coiled spring-type members.

8. The actuator elements according to claim 4, wherein said conductive substrates are in the form of coiled spring-type members.

9. The actuator elements according to claim 1, wherein the ratio of expansion and contraction of the conductive polymer is not less than 16%.

10. The actuator elements according to claim 2, wherein the ratio of expansion and contraction of the conductive polymer is not less than 16%.

11. The actuator elements according to claim 3, wherein the ratio of expansion and contraction of the conductive polymer is not less than 16%.

12. The actuator elements according to claim 4, wherein the ratio of expansion and contraction of the conductive polymer is not less than 16%.

13. The actuator elements according to claim 1, wherein said actuator elements are configured to physically move an object.

14. The actuator elements according to claim 6, wherein said actuator elements are configured to physically move an object.

15. The actuator elements according to claim 1, wherein the conductive polymers used contain a trifluoromethane-sulfonate ion and/or an anion containing a plurality of fluorine atoms for a central atom.

16. The actuator elements according to claim 2, wherein the conductive polymers used contain a trifluoromethane-sulfonate ion and/or an anion containing a plurality of fluorine atoms for a central atom.

17. The actuator elements according to claim 1, wherein the outer diameter or width of said actuator elements is less than 1 mm.

18. The actuator elements according to claim 1, wherein the mechanical strength is 53 MPa or more.

19. The actuator elements according to claim 2, wherein the outer diameter or width of said actuator elements is less than 1 mm.

20. The actuator elements according to claim 2, wherein the mechanical strength is 53 MPa or more.

21. An actuator element, comprising:
conductive substrates and conductive polymers,
the conductive substrates having a stretching property and also having a shape including coiled spring-type members, meshed members or fiber structure sheets,
said conductive substrates are used as working electrodes,
said conductive polymers are directly formed on said working electrodes by electropolymerization,
the conductivity of the conductive substrates being not less than $1.0 \times 10^3$ S/cm, and
said actuator element being expanded and bent by electrolytic expansion of the conductive polymers,
wherein the conductive polymers fill the space of the conductive substrates.

* * * * *